United States Patent
Newman et al.

(10) Patent No.: US 11,800,141 B2
(45) Date of Patent: Oct. 24, 2023

(54) METHODS AND APPARATUS FOR MAXIMIZING CODEC BANDWIDTH IN VIDEO APPLICATIONS

(71) Applicant: GoPro, Inc., San Mateo, CA (US)

(72) Inventors: David A. Newman, San Diego, CA (US); Cesar Douady, Orsay (FR); Alexis Lefebvre, Paris (FR); Daryl Stimm, Encinitas, CA (US); Michael Kraak, Cachan (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/453,217

(22) Filed: Nov. 2, 2021

(65) Prior Publication Data

US 2022/0060738 A1 Feb. 24, 2022

Related U.S. Application Data

(63) Continuation of application No. 16/572,383, filed on Sep. 16, 2019, now Pat. No. 11,228,781.
(Continued)

(51) Int. Cl.
*G06T 3/00* (2006.01)
*H04N 19/40* (2014.01)
(Continued)

(52) U.S. Cl.
CPC .......... *H04N 19/52* (2014.11); *G06T 3/0087* (2013.01); *H04N 19/182* (2014.11); *H04N 19/198* (2014.11); *H04N 19/40* (2014.11)

(58) Field of Classification Search
None
See application file for complete search history.

(56) References Cited

U.S. PATENT DOCUMENTS

| 5,257,051 A | 10/1993 | Bushroe |
| 5,703,701 A | 12/1997 | Yamamoto |

(Continued)

FOREIGN PATENT DOCUMENTS

WO 2018236050 A1 12/2018

OTHER PUBLICATIONS

"3rd Generation Partnership Project; Technical Specification Group Services and System Aspects; Virtual Reality (VR) media services over 3GPP (Release 15)", 3GPP Standard ; Technical Report ; 3GPP TR 26.918, 3rd Generation Partnership Project (3GPP), Mobile Competence Centre ; 650, Route Des Lucioles ; F-06921 Sophia-Antipolis Cedex ; FRANCE, (May 3, 2017), vol. SA WG4, No. V0.7.0, pp. 1-58, XP051298214.

(Continued)

*Primary Examiner* — Mohammad J Rahman
(74) *Attorney, Agent, or Firm* — Wang Hardoon, P.C.

(57) ABSTRACT

Methods and apparatus for processing of video content to optimize codec bandwidth. In one embodiment, the method includes capturing panoramic imaging content (e.g., a 360° panorama), mapping the panoramic imaging content into an equi-angular cubemap (EAC) format, and splitting the EAC format into segments for transmission to maximize codec bandwidth. In one exemplary embodiment, the EAC segments are transmitted at a different frame rate than the subsequent display rate of the panoramic imaging content. For example, the mapping and frame rate may be chosen to enable the rendering of 8K, 360° content at 24 fps, using commodity encoder hardware and software that nominally supports 4K content at 60 fps.

18 Claims, 13 Drawing Sheets

Related U.S. Application Data

(60) Provisional application No. 62/867,136, filed on Jun. 26, 2019.

(51) Int. Cl.
  *H04N 19/52* (2014.01)
  *H04N 19/182* (2014.01)
  *H04N 19/196* (2014.01)

(56) References Cited

U.S. PATENT DOCUMENTS

| | | | |
|---|---|---|---|
| 6,118,556 A | 9/2000 | Yamamoto | |
| 6,141,034 A | 10/2000 | McCutchen | |
| 6,373,895 B2 | 4/2002 | Saunders | |
| 7,835,437 B1 | 11/2010 | Zhang | |
| 8,055,974 B2 | 11/2011 | Mizuno | |
| 8,606,029 B1 | 12/2013 | Wong | |
| 9,172,924 B1 | 10/2015 | Martel | |
| 9,294,757 B1 | 3/2016 | Lewis | |
| 9,721,393 B1 | 8/2017 | Dunn | |
| 9,787,862 B1 | 10/2017 | Newman | |
| 9,894,422 B2 | 2/2018 | Hwang | |
| 10,187,568 B1 | 1/2019 | Tran | |
| 10,321,109 B1 | 6/2019 | Tanumihardja | |
| 10,349,055 B1 | 7/2019 | Waggoner | |
| 10,666,941 B1 | 5/2020 | Doron | |
| 11,004,176 B1 | 5/2021 | Newman | |
| 11,024,008 B1 | 6/2021 | Newman | |
| 11,049,219 B2 | 6/2021 | Newman | |
| 11,109,067 B2 | 8/2021 | Newman | |
| 11,228,781 B2 | 1/2022 | Newman | |
| 2001/0036356 A1 | 11/2001 | Weaver | |
| 2002/0009151 A1 | 1/2002 | Gentric | |
| 2002/0097322 A1 | 7/2002 | Monroe | |
| 2002/0141659 A1 | 10/2002 | Florin | |
| 2002/0159632 A1 | 10/2002 | Chui | |
| 2003/0016289 A1 | 1/2003 | Motomura | |
| 2003/0048921 A1 | 3/2003 | Cahill | |
| 2003/0103678 A1 | 6/2003 | Hsuan | |
| 2003/0123857 A1 | 7/2003 | Egawa | |
| 2003/0206582 A1 | 11/2003 | Srinivasan | |
| 2004/0156548 A1 | 8/2004 | Kodama | |
| 2004/0158878 A1 | 8/2004 | Ratnakar | |
| 2004/0240856 A1 | 12/2004 | Yahata | |
| 2005/0044112 A1 | 2/2005 | Yamamoto | |
| 2005/0195899 A1 | 9/2005 | Han | |
| 2005/0265619 A1 | 12/2005 | Ozaki | |
| 2006/0001742 A1 | 1/2006 | Park | |
| 2006/0024041 A1 | 2/2006 | Lou | |
| 2006/0034523 A1 | 2/2006 | Park | |
| 2006/0256380 A1 | 11/2006 | Klassen | |
| 2007/0005795 A1* | 1/2007 | Gonzalez | H04N 21/23412 375/E7.006 |
| 2007/0065139 A1 | 3/2007 | Ishii | |
| 2007/0102520 A1 | 5/2007 | Carlson | |
| 2007/0253490 A1 | 11/2007 | Makino | |
| 2007/0274599 A1 | 11/2007 | Ishikawa | |
| 2007/0291115 A1 | 12/2007 | Bachelder | |
| 2008/0084926 A1 | 4/2008 | Valenzuela | |
| 2008/0101455 A1 | 5/2008 | Scheelke | |
| 2008/0129844 A1 | 6/2008 | Cusack | |
| 2008/0159594 A1 | 7/2008 | Chiu | |
| 2008/0225132 A1 | 9/2008 | Inaguma | |
| 2008/0252719 A1 | 10/2008 | Choi | |
| 2008/0259409 A1 | 10/2008 | Nishizawa | |
| 2009/0219282 A1 | 9/2009 | Kim | |
| 2010/0053212 A1 | 3/2010 | Kang | |
| 2010/0071010 A1 | 3/2010 | Elnathan | |
| 2010/0088646 A1 | 4/2010 | Nishimori | |
| 2010/0157018 A1 | 6/2010 | Lampotang | |
| 2010/0157090 A1 | 6/2010 | Kobayashi | |
| 2010/0169779 A1 | 7/2010 | Mason | |
| 2010/0271394 A1 | 10/2010 | Howard | |
| 2010/0299630 A1 | 11/2010 | McCutchen | |
| 2011/0010497 A1 | 1/2011 | Bryant-Rich | |
| 2011/0013849 A1 | 1/2011 | Saito | |
| 2011/0135000 A1 | 6/2011 | Alshina | |
| 2012/0086850 A1 | 4/2012 | Irani | |
| 2012/0128058 A1 | 5/2012 | Bakharov | |
| 2012/0163725 A1 | 6/2012 | Fukuhara | |
| 2012/0194685 A1 | 8/2012 | Kawakami | |
| 2012/0300984 A1 | 11/2012 | Dann | |
| 2013/0128121 A1 | 5/2013 | Agarwala | |
| 2013/0141572 A1 | 6/2013 | Torres | |
| 2013/0155250 A1* | 6/2013 | Myers | H04N 7/181 348/159 |
| 2013/0162766 A1 | 6/2013 | Cohen | |
| 2013/0166580 A1 | 6/2013 | Maharajh | |
| 2013/0195205 A1 | 8/2013 | Wang | |
| 2013/0198233 A1 | 8/2013 | Jacobson | |
| 2013/0198337 A1 | 8/2013 | Nix | |
| 2014/0119675 A1 | 5/2014 | Kim | |
| 2014/0133568 A1 | 5/2014 | Otsuka | |
| 2014/0165125 A1 | 6/2014 | Lee | |
| 2014/0192151 A1 | 7/2014 | Wang | |
| 2014/0218608 A1 | 8/2014 | Stelliga | |
| 2014/0267842 A1 | 9/2014 | Lee | |
| 2014/0347450 A1 | 11/2014 | Han | |
| 2014/0348248 A1 | 11/2014 | Ihara | |
| 2015/0163476 A1 | 6/2015 | Grafulla-González | |
| 2015/0187389 A1 | 7/2015 | Horita | |
| 2015/0222293 A1 | 8/2015 | Lida | |
| 2015/0319462 A1 | 11/2015 | Ramasubramonian | |
| 2015/0350682 A1 | 12/2015 | Zhang | |
| 2016/0073023 A1 | 3/2016 | Rondinelli | |
| 2016/0094847 A1 | 3/2016 | Ibrahim | |
| 2016/0103715 A1 | 4/2016 | Sethia | |
| 2016/0112489 A1 | 4/2016 | Adams | |
| 2016/0134881 A1 | 5/2016 | Wang | |
| 2016/0148431 A1 | 5/2016 | Seydoux | |
| 2016/0150241 A1 | 5/2016 | Hirabayashi | |
| 2016/0165309 A1 | 6/2016 | Van Brandenburg | |
| 2016/0261373 A1 | 9/2016 | Nagasaka | |
| 2016/0335484 A1 | 11/2016 | Xie | |
| 2016/0337706 A1 | 11/2016 | Hwang | |
| 2016/0360104 A1 | 12/2016 | Zhang | |
| 2016/0360295 A1 | 12/2016 | Hwang | |
| 2016/0373771 A1 | 12/2016 | Hendry | |
| 2017/0078574 A1 | 3/2017 | Puntambekar | |
| 2017/0094278 A1 | 3/2017 | Bickerstaff | |
| 2017/0118540 A1 | 4/2017 | Thomas | |
| 2017/0148186 A1 | 5/2017 | Holzer et al. | |
| 2017/0155924 A1 | 6/2017 | Gokhale | |
| 2017/0195565 A1 | 7/2017 | Ollier | |
| 2017/0214861 A1* | 7/2017 | Rachlin | G02B 27/1066 |
| 2017/0236252 A1 | 8/2017 | Nguyen | |
| 2017/0243384 A1 | 8/2017 | Huang | |
| 2017/0272758 A1 | 9/2017 | Lin | |
| 2017/0295373 A1 | 10/2017 | Zhang | |
| 2017/0302990 A1 | 10/2017 | Ying | |
| 2017/0336705 A1 | 11/2017 | Zhou | |
| 2017/0339341 A1 | 11/2017 | Zhou | |
| 2017/0366808 A1 | 12/2017 | Lin | |
| 2018/0027178 A1 | 1/2018 | Macmillan | |
| 2018/0027181 A1 | 1/2018 | Roulet | |
| 2018/0035047 A1 | 2/2018 | Lei | |
| 2018/0040164 A1 | 2/2018 | Newman | |
| 2018/0054695 A1* | 2/2018 | Castor | H04W 68/005 |
| 2018/0075635 A1 | 3/2018 | Choi | |
| 2018/0101931 A1 | 4/2018 | Abbas | |
| 2018/0103199 A1 | 4/2018 | Hendry | |
| 2018/0160160 A1 | 6/2018 | Swaminathan | |
| 2018/0184121 A1 | 6/2018 | Kim | |
| 2018/0190323 A1 | 7/2018 | De Jong | |
| 2018/0192074 A1 | 7/2018 | Shih | |
| 2018/0218484 A1 | 8/2018 | Shen | |
| 2018/0276800 A1 | 9/2018 | Abbas | |
| 2018/0288356 A1 | 10/2018 | Ray | |
| 2018/0343470 A1 | 11/2018 | Schmit | |
| 2018/0352245 A1 | 12/2018 | MacDonald | |
| 2019/0007669 A1 | 1/2019 | Kim | |
| 2019/0007676 A1 | 1/2019 | Katsumata | |
| 2019/0035064 A1* | 1/2019 | Franklin | G06T 7/248 |
| 2019/0104326 A1 | 4/2019 | Stockhammer | |

(56) References Cited

U.S. PATENT DOCUMENTS

| | | | |
|---|---|---|---|
| 2019/0158859 A1 | 5/2019 | Zhang | |
| 2019/0213425 A1 | 7/2019 | Anderson | |
| 2019/0222756 A1 | 7/2019 | Moloney | |
| 2019/0230283 A1 | 7/2019 | Ollier | |
| 2019/0235748 A1 | 8/2019 | Seol | |
| 2019/0313026 A1* | 10/2019 | Cheng | H04J 3/14 |
| 2019/0333237 A1 | 10/2019 | Javidnia | |
| 2020/0014954 A1 | 1/2020 | Watson | |
| 2020/0053392 A1 | 2/2020 | Hannuksela | |
| 2020/0053393 A1 | 2/2020 | Niamut | |
| 2020/0084428 A1 | 3/2020 | Oh | |
| 2020/0092582 A1 | 3/2020 | Xiu | |
| 2020/0107003 A1 | 4/2020 | Phillips | |
| 2020/0250454 A1 | 8/2020 | Croxford | |
| 2020/0351449 A1 | 11/2020 | Oh | |
| 2020/0413086 A1 | 12/2020 | Newman | |
| 2020/0413093 A1 | 12/2020 | Newman | |
| 2021/0090214 A1 | 3/2021 | Newman | |
| 2021/0125303 A1 | 4/2021 | MacDonald | |
| 2021/0192796 A1 | 6/2021 | Aflaki Beni | |
| 2021/0287337 A1 | 9/2021 | Newman | |
| 2021/0392375 A1 | 12/2021 | Newman | |
| 2022/0132144 A1 | 4/2022 | Sauer | |
| 2023/0011843 A1 | 1/2023 | MacDonald | |

OTHER PUBLICATIONS

Hall; GPU Accelerated Feature Algorithms for Mobile Devices; Mar. 2014; School of Computing and Mathematical Sciences, Auckland University; pp. 1-150.

International Search Report and Written Opinion issued in PCT/US2019/68386, dated Mar. 20, 2020, 11 pages.

Jeppsson et al. "Efficient Live and on-Demand Tiled HEVC 360 VR Video Streaming," 2018 IEEE International Symposium on Multimedia (ISM), Taichung, 2018, pp. 81-88.

Paul Bourke; Converting a fisheye image into a panoramic, spherical or perspective projection; Jul. 2016 (25 pages).

Qin et al., "On-Demand Sharing of a High-Resolution Panorama Video from Networked Robotic Cameras", Proceedings of the 2007 IEEE/RSJ International Conference on Intelligent Robots and Systems San Diego, CA, USA, Oct. 29-Nov. 2, 2007, 6 pages.

Yuwen He et al., "JVET-D0021 (DOC). AHG8: InterDigital's projection format conversion tool", Joint Video Exploration Team (JVET). of ITU-T SG 16 WP 3 and ISO/IEC JTC 1/SC 29/WG 11. 4th Meeting: Chengdu, CN, Oct. 15-21, 2016, (Oct. 21, 2016), URL: http://phenix.int-evry.fr/jvet/doc_end_user/current_document.php?id=2717, (Oct. 29, 2019), XP055637250, 35 pages.

\* cited by examiner

METHODS AND APPARATUS FOR MAXIMIZING CODEC BANDWIDTH IN VIDEO APPLICATIONS

PRIORITY

This application is a continuation of, and claims the benefit of priority to U.S. patent application Ser. No. 16/572,383, filed Sep. 16, 2019, and entitled "METHODS AND APPARATUS FOR MAXIMIZING CODEC BANDWIDTH IN VIDEO APPLICATIONS", that claims the benefit of priority to U.S. Provisional Patent Application Ser. No. 62/867,136, filed Jun. 26, 2019, and entitled "METHODS AND APPARATUS FOR MAXIMIZING CODEC BANDWIDTH IN VIDEO APPLICATIONS", each of which are incorporated herein by reference in its entirety.

RELATED APPLICATIONS

The subject matter of this application is generally related to U.S. patent application Ser. No. 16/234,396 filed Dec. 27, 2018 and entitled "METHODS AND APPARATUS FOR MULTI-ENCODER PROCESSING OF HIGH RESOLUTION CONTENT", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to the encoding/decoding of high-resolution content using extant video codecs.

DESCRIPTION OF RELATED TECHNOLOGY

Imaging sensors, such as for example imaging sensors contained within image capture devices such as the GoPro HERO™ or Fusion™ families of devices manufactured by GoPro, Inc., may natively capture imaging content (e.g., still images, video content, panoramic content) at a resolution that is incompatible with many extant imaging codecs contained within many common computing devices (such as smart phones). Accordingly, many types of captured imaging content may not be processed at their natively captured resolutions. One consideration relates to the extant ecosystem of hardware and software with which the captured image data will ultimately be utilized.

As a brief aside, existing video codec (encoding/decoding) infrastructure is standardized such that the various participants of the ecosystem (e.g., manufacturers, component vendors, customers, etc.) can interact without interoperability issues. For example, HEVC (also known as H.265 and/or MPEG-H Part 2 (Motion Picture Experts Group)) promulgates specific requirements for e.g., audio/visual (A/V) formats and data structures. Once the specific A/V formats have been published, codec manufacturers can create codecs that support the promulgated standards. In parallel, software developers can write software for applications with confidence that their applications will correctly function in the newly designed hardware.

Depending on the size/resolution of the captured image data, hardware processing may be utilized in place of software-based processing. While software-based processing offers flexibility, software-based processing is far slower than hardware-based data processing and unsuitable for more intensive applications. As such, constraining or formatting data for hardware-based codec processing may be desirable to obviate software-based processing.

To these ends, methods and apparatus are needed to, among other things, optimize image processing performance and bandwidth utilization, especially in view of the hardware/software of the planned or extant ecosystem within which the captured image data will be used.

SUMMARY

The present disclosure satisfies the foregoing needs by providing, inter alia, methods and apparatus for enabling the processing of high-resolution imaging content.

In one aspect, a method for maximizing codec throughput is disclosed. In one embodiment, the method includes: capturing image data of a first size; multiplexing the image data into a plurality of portions of a second size; encoding the plurality of portions at an encoding rate; and wherein the encoding rate and the second size maximize throughput of a codec.

In one variant, the encoding rate is 24 frames per second (fps) and the second size comprises 3840 pixels by 1920 pixels; and the codec includes a High Efficiency Video Coding (HEVC) Level 5.1 codec.

In another variant, the first size exceeds at least one hardware limitation of the codec; and the second size does not exceed the at least one hardware limitation of the codec. For example, the at least one hardware limitation may be either a maximum column size or a maximum row size.

In one variant, the image data comprises an equi-angular cubemap (EAC) projection. In one such variant, multiplexing the image data includes splitting the equi-angular cubemap (EAC) projection such that the plurality of portions have contiguous image data. In another variant, encoding the plurality of portions at the encoding rate is performed in a plurality of stages.

In a related aspect, an apparatus configured to perform the foregoing techniques are described. In one exemplary embodiment, the apparatus may include a processor, and a non-transitory computer-readable medium comprising one or more instructions which when executed, cause the apparatus to: capture image data of a first size; multiplex the image data into a plurality of portions of a second size; encode the plurality of portions at an encoding rate; wherein the encoding rate and the second size maximize throughput of a codec.

In another related aspect, methods, systems, and apparatus for decoding the plurality of portions; and de-multiplexing the portions to maximize throughput of a codec are disclosed.

In another aspect, a method for staged codec operation is disclosed. In one embodiment, the method includes generating image data having an image discontinuity; multiplexing the image data into multiple stages of codec operation. In one exemplary approach, each stage of the multiple stages of the codec operation includes: encoding a portion of the image data; writing the portion to a memory; and wherein each portion of the image data is a contiguous image.

In one variant, the image data includes an equi-angular cubemap (EAC) projection.

In one variant, the method further includes: for each stage of the multiple stages of the codec operation transcoding the portion of the image data.

In one variant, each stage of the multiple stages of the codec operation are associated with a corresponding portion of the memory.

In one variant, each stage of the multiple stages of the codec operation are performed by a single codec.

In one variant, at least a first stage of the multiple stages of the codec operation are performed by a first codec and at least a second stage of the multiple stages of the codec operation are performed by a second codec.

In one variant, the image data exceeds at least one hardware limitation of a codec; and the portion does not exceed the at least one hardware limitation of the codec.

In another aspect, an apparatus configured to perform the foregoing techniques are described. In one exemplary embodiment, the apparatus may include a processor, and a non-transitory computer-readable medium comprising one or more instructions which when executed, cause the apparatus to: generate image data having an image discontinuity; multiplex the image data into multiple stages of codec operation. In one exemplary variant, each stage of the multiple stages of the codec operation includes: encoding a portion of the image data; writing the portion to a memory; and wherein each portion of the image data is a contiguous image.

In another aspect, methods, systems, and apparatus for decoding the plurality of portions; and de-multiplexing the portions in multiple stages of codec operation are disclosed.

In a further aspect, a method for transferring redundant image data is disclosed. In one embodiment, the method includes: capturing a plurality of images via a plurality of camera sensors; stitching the plurality of images to generate the redundant image data; multiplexing image data and the redundant image data into a plurality of portions of a second size; encoding the plurality of portions at an encoding rate; and wherein the encoding rate and the second size do not exceed a codec limitation.

In one variant, the plurality of images are captured with different light conditions. In one implementation of such variant, stitching the plurality of images comprises generating a warp track. In one such case, the redundant image data comprises two versions of at least one image pixel captured with the different light conditions. In another exemplary variant, the redundant image data is selected based on the warp track. Additionally, the redundant image data may be decimated based on the warp track.

In a related aspect, an apparatus configured to perform the foregoing techniques are described. In one exemplary embodiment, the apparatus may include a processor, and a non-transitory computer-readable medium comprising one or more instructions which when executed, cause the apparatus to: capture a plurality of images via a plurality of camera sensors; stitch the plurality of images to generate the redundant image data; multiplex image data and the redundant image data into a plurality of portions of a second size; encode the plurality of portions at an encoding rate; and wherein the encoding rate and the second size do not exceed a codec limitation.

In another aspect, methods, systems, and apparatus for decoding the plurality of portions; and de-multiplexing the redundant image data for e.g., image processing, rendering, and/or display are disclosed.

In yet another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device.

Other aspects, features and advantages of the present disclosure will immediately be recognized by persons of ordinary skill in the art with reference to the attached drawings and detailed description of exemplary embodiments as given below.

BRIEF DESCRIPTION OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
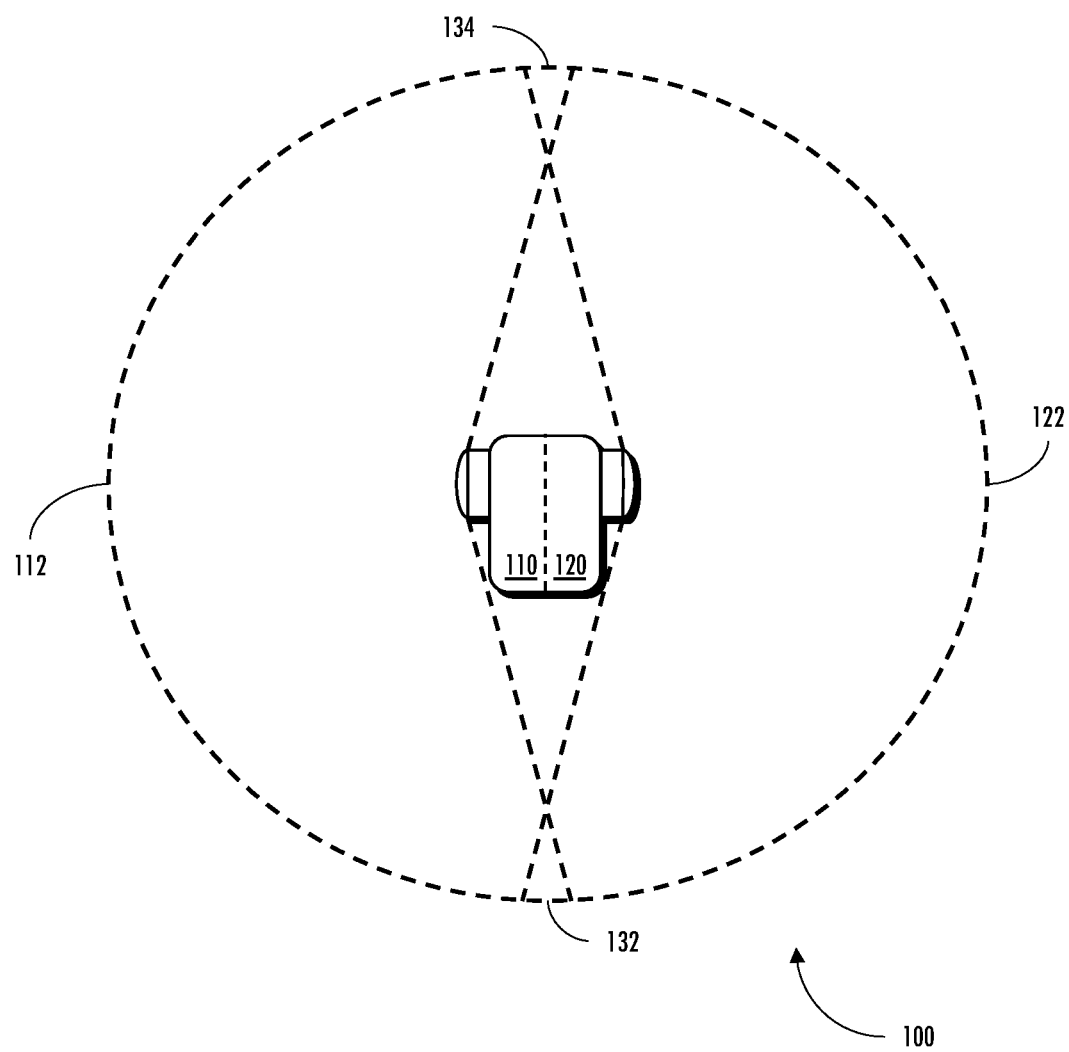
FIG. 1 illustrates one approach of using two fisheye lenses in a back-to-back configuration to generate a 360° panoramic image, useful in conjunction with the embodiments described herein.

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

OVERVIEW

In one aspect, the present disclosure provides methods and apparatus that advantageously leverage extant commodity hardware/software ecosystems to provide higher resolutions at lower frame rates (or vice versa). For example, an exemplary A/V format is described that is compatible with the widely deployed Level 5.1 HEVC codec, but which enables delivery of a 360° panorama having 7680×3840 pixels at 24 fps. In other words, the principles described herein enable "8K Cinema" video delivery on most existing consumer devices e.g., smart phones and action cameras (circa 2019). Notably, 24 fps is the cinema frame rate.

As a brief aside, certain frame rates and/or resolutions have special market importance. For example, the "8K Cinema" designation carries commercial significance for the consuming public. Nonetheless, while the various principles described herein are described in the context of a specific commercially important implementation, artisans of ordinary skill in the related arts given the contents of the present disclosure will readily appreciate that the principles described herein may be used to support many different combinations of resolution and frame rate. For example, the techniques described herein could also advantageously be extended to other available and/or future codec standards.

Various aspects of the present disclosure are directed to efficiently transporting media within the hardware-specific limitations of existing commodity video codecs. In one exemplary embodiment, an action camera performs an "in-camera" stitch to encode a spherical video as an equi-angular cubemap (EAC) projection having six facets. The EAC projection is further divided into three image segments for distribution within existing codec infrastructures. In one exemplary variant, the spherical video is mapped into an audio/visual (A/V) format composed of three 3840×1920 pixel image segments (each composed of two 1920×1920 pixel facets) having a total frame rate of 24 frames per second (fps). While the exemplary A/V format is not an explicitly supported format for Level 5.1 HEVC codecs, the techniques described herein "trick" the Level 5.1 HEVC codec hardware into maximizing its throughput. In other words, the Level 5.1 HEVC codec is "tricked" into encoding/decoding a non-supported format via hardware acceleration (rather than using a software emulated codec).

Notably, "commodity" codecs are specified for the most common applications (computer monitors, movies, etc.), and these specifications generally identify particular "native" aspect ratios and frame rates (e.g., 4096×2160@60 fps). These display formats commonly use aspect ratios that range between 1.77:1 to 1.9:1 and/or require faster frame rates (for video gaming, etc.). Recently however, the growing popularity of action cameras and other 360° applications have elevated the importance of the 1.5:1 aspect ratio (e.g., 3:2). More generally, artisans of ordinary skill in the related arts will readily appreciate that the various principles described herein may be broadly extended to any re-shaping or re-projecting of videos to non-native resolutions and/or frame rates to suit current and future applications.

Commodity Codec Design and Non-traditional Use Cases

As a brief aside, encoding and decoding of audio/visual (A/V) media can be handled via either software emulation, or in dedicated hardware circuits. Hardware codecs are composed of physical logic and sequential components; thus, hardware codecs have hard limitations on the amount of data that they can process (e.g., throughput) and the size of data they can handle (e.g., row and/or column buffer sizes). For example, most existing hardware codecs that comply with High Efficiency Video Coding (HEVC) Level 5.1 include hardware components that accept pixel line widths up to (but not exceeding) 4096 pixels (and/or pixel column depths up to 2160 pixels). In contrast, software-based codecs can be useful where the A/V media is of unusual size/frame rate or has non-standardized features. Unfortunately, software-based codec operation logically emulates hardware with arithmetic operations which consumes processing resources and is much slower (e.g., 50×). As a practical matter, while software-based processing has advantages in certain circumstances, it is unsuitable for more intensive applications.

As a brief clarification, High Efficiency Video Coding (HEVC) standard (H.265) and its predecessor H.264 do not specify resolution limits in width and height, only the maximum number of luma samples per frame. Theoretically, compliant codecs should be able to handle use cases that exceed 4096 pixel line widths and/or pixel column depths up to 2160 pixels, but most deployed codecs (especially in smartphones) ignore non-traditional use cases. As a practical matter, device manufacturers (such as GoPro, Inc.) assume that other devices within the consumer electronics ecosystem do not support non-traditional A/V formats.

The aforementioned High Efficiency Video Coding (HEVC) standard (H.265) provides significantly better data compression at the same level of video quality over its predecessor (H.264). Both H.265 and H.264 specify different levels of operation that correspond to different maximum resolutions and frame rates. For example, HEVC Level 5.1 codecs support video compression up to 4096×2160 pixels at 60 fps ("4Kp60"). Notably, HEVC (H.265) and H.264 use a confusingly similar naming convention, however the supported features are not identical. Thus, for example an HEVC Level 5.1 codec has similar (but not identical) feature support as a H.264 Level 5.2 codec. While the present disclosure is described in the context of HEVC codecs, artisans of ordinary skill in the related arts will readily appreciate that the various principles described herein could be readily adapted to other codec technologies (e.g., H.264 codecs, etc.)

Many device manufacturers (such as GoPro, Inc.) source components from a variety of component manufacturers. The bill of materials (BOM) cost is often a critical factor in determining what features are (or are not) supported in consumer electronics. As a result, the capabilities and ubiquity of the target codec(s) of the user's ecosystem are an important factor in considering the overall cost of manufacture. For instance, one area of significant commercial interest is spherical video photography. One proposed format for storing spherical content is as an "EAC" (equi-angular cubemap) format. The EAC format represents a full 360° panorama with a six-sided cube. The EAC format has significant commercial adoption (e.g., content providers, social networks, websites, etc.) and a variety of consumer applications.

FIG. 1 illustrates one approach of using two fisheye lenses in a back-to-back configuration to generate a 360° panoramic image. In one such implementation, each lens covers more than a hemisphere (e.g., on the order of 190°), and the 360° panoramic image data generated from sensors having these lenses may be put in so-called "EAC" (equi-angular cubemap) format, such as is described in U.S. patent application Ser. No. 16/234,396 filed Dec. 27, 2018 and entitled "METHODS AND APPARATUS FOR MULTI-ENCODER PROCESSING OF HIGH RESOLUTION CONTENT," previously incorporated herein. As shown in FIG. 1, the camera system 100 includes a first camera 110 capturing a first field of view (FOV) 112 and a second camera 120 capturing a second FOV 122. In one or more implementations, the cameras 110, 120 may be integrated in a back-to-back configuration in which cameras 110, 120 face opposite directions. For example, in operation, the first camera 110 may be a "front-facing" camera 110 such that a user may point the first camera towards an object or scene of interest and the second camera 120 may be a "rear-facing" camera facing in an opposite direction of the front-facing camera 110. While the designations of front-facing and rear-facing are useful in describing the example processes described herein, these designations are arbitrary and the camera system 100 may operate in any absolute or relative orientation.

The fields of view 112, 122 may each include a hyper-hemispherical FOV that captures slightly greater than a 180° range in at least one direction. Because the respective fields of view 112, 122 are hyper-hemispherical (e.g., greater than 180°), they overlap in overlapping regions 132, 134 near their respective boundaries. For example, the fields of view 112, 122 may overlap by n degrees (e.g., where n equals 1°, 5°, 10° or other various degrees of field of view overlap between, for example, a front-facing and rear-facing camera). These overlapping regions 132, 134 may be used for the stitching of separately captured images obtained by the respective cameras no, 120, as will be described in further detail below. In implementations where the respective FOV ranges are equal for each of the first camera 110 and the second camera 120, these configurations will be referred to hereinafter as symmetric lensing configurations. It will be appreciated, however, that cameras with unequal FOV ranges are also contemplated by the present disclosure.

While the embodiments described herein discuss specific resolution examples, it would be readily apparent to one of ordinary skill that these specific resolutions are merely exemplary and that other values of each could be readily substituted with equal success. Moreover, systems with varying image density profiles (such as for example those described in U.S. patent application Ser. No. 16/235,866 filed Dec. 28, 2018 and entitled "APPARATUS AND METHODS FOR NON-UNIFORM DOWNSAMPLING OF CAPTURED PANORAMIC IMAGES" which is incorporated herein by reference in its entirety) may be used consistent with the methods and apparatus of the present disclosure.

Figure 2A:
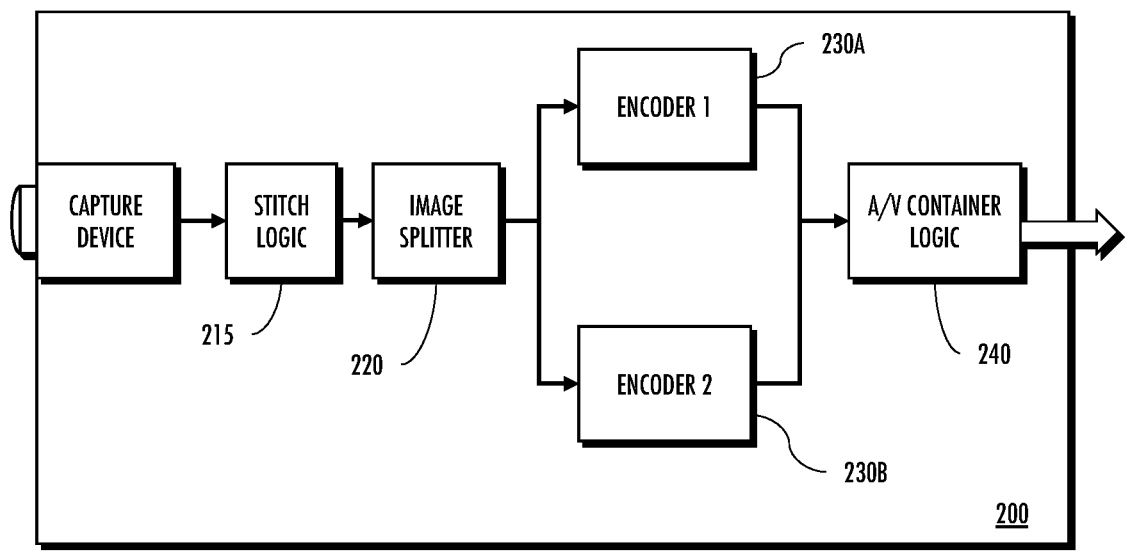
FIGS. 2A-C are graphical depictions of a system for transferring an image with a non-traditional aspect ratio, useful in explaining various principles of the present disclosure.
Figure 2B:
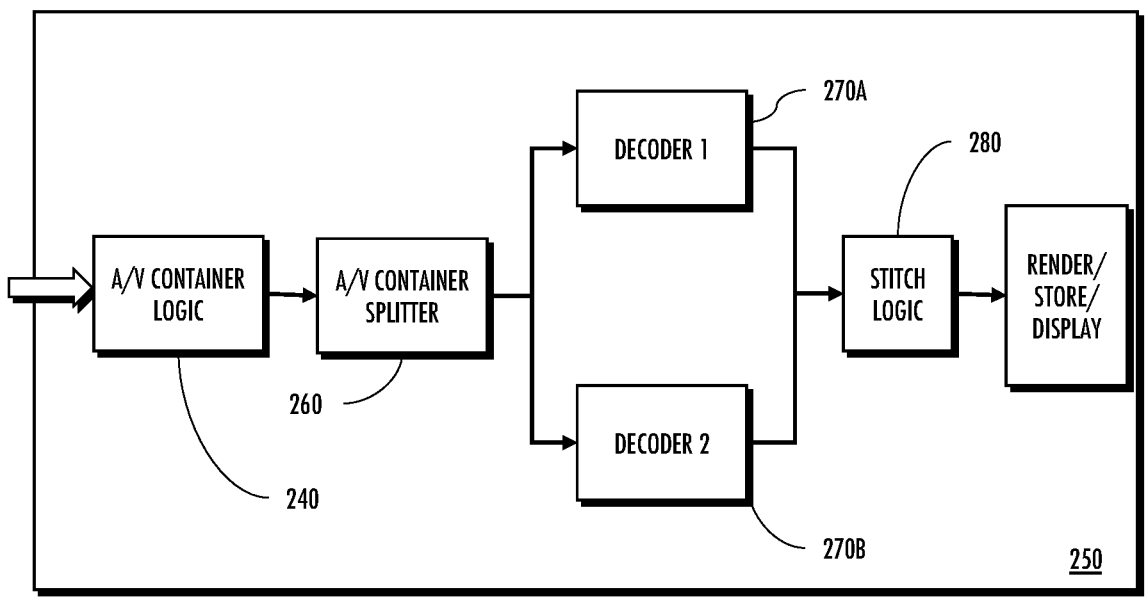

The spherically captured fisheye images can be stitched together into a spherical projection such as an equi-angular cubemap (EAC) format for transfer between a capture device 200 of FIG. 2A and a display device 250 of FIG. 2B. Referring first to FIG. 2A, an exemplary capture device 200 for the capture and encoding of non-traditional imaging content is shown. The captured hemispheric content (e.g., natively captured imaging content) is spherically stitched together as a spherical projection by stitching logic 215. Thereafter, the spherical projection is provided to an image splitter 220 on the encode-side of the capture side of the processing pipeline. The image splitter 220 may split up the captured imaging content and pass along the split captured imaging content to a parallel set of encoders 230A, 230B. While the illustrated embodiment describes a pair of encoders, other implementations may use a greater number of encoders (e.g., three, four, etc.)

The output of these encoders 230A, 230B may be coupled and fed into one or more audio/visual (A/V) container logic 240. For example, the A/V container logic 240 may include logic to contain, using an MP4 container format, the multiple instances output from respective encoders 230A, 230B. These may be stored within respective tracks contained within a single A/V container. In some implementations, the output from respective encoders 230A, 230B may be fed into two or more A/V containers (e.g., into single track MP4 containers, into multiple dual track MP4 containers, and/or into multiple multi-track MP4 containers, etc.). The output of these A/V container logic 240 may then be transmitted off of the capture device 200. For example, the output A/V container may be stored onto a storage apparatus (e.g., a memory stick) and/or may be transmitted across an interface (such as a network interface over, for example, the Internet).

Referring now to FIG. 2B, a display device 250 for the rendering of non-traditional imaging content is shown and described in detail. The output of the A/V container logic 240, such as the A/V container(s) output from capture device 200, may be received/retrieved by system 250. These A/V container(s) may be coupled to an A/V container splitter (decode-side) 260. In some implementations, the A/V container splitter 260 may read metadata information contained within the A/V container(s) 240 so as to enable the A/V container splitter 260 to, for example, properly partition out the imaging portions contained within the A/V container(s) 240 so that these imaging portions may be properly decoded within the hardware decoders 270A, 270B.

In some implementations, the metadata information (included in or separate from the aforementioned metadata file) may include timestamp information for respective imaging portions so as to enable these imaging portions to be recognized and recombined appropriately by, for example, stitch apparatus 280. The stitch apparatus 280 may recombine the decoded image portions from the decoders 270A, 270B. In some implementations, the stitching algorithm for the stitch apparatus 280 may recombine the decoded image portions based on metadata information contained within the A/V container logic 240.

Figure 2C:
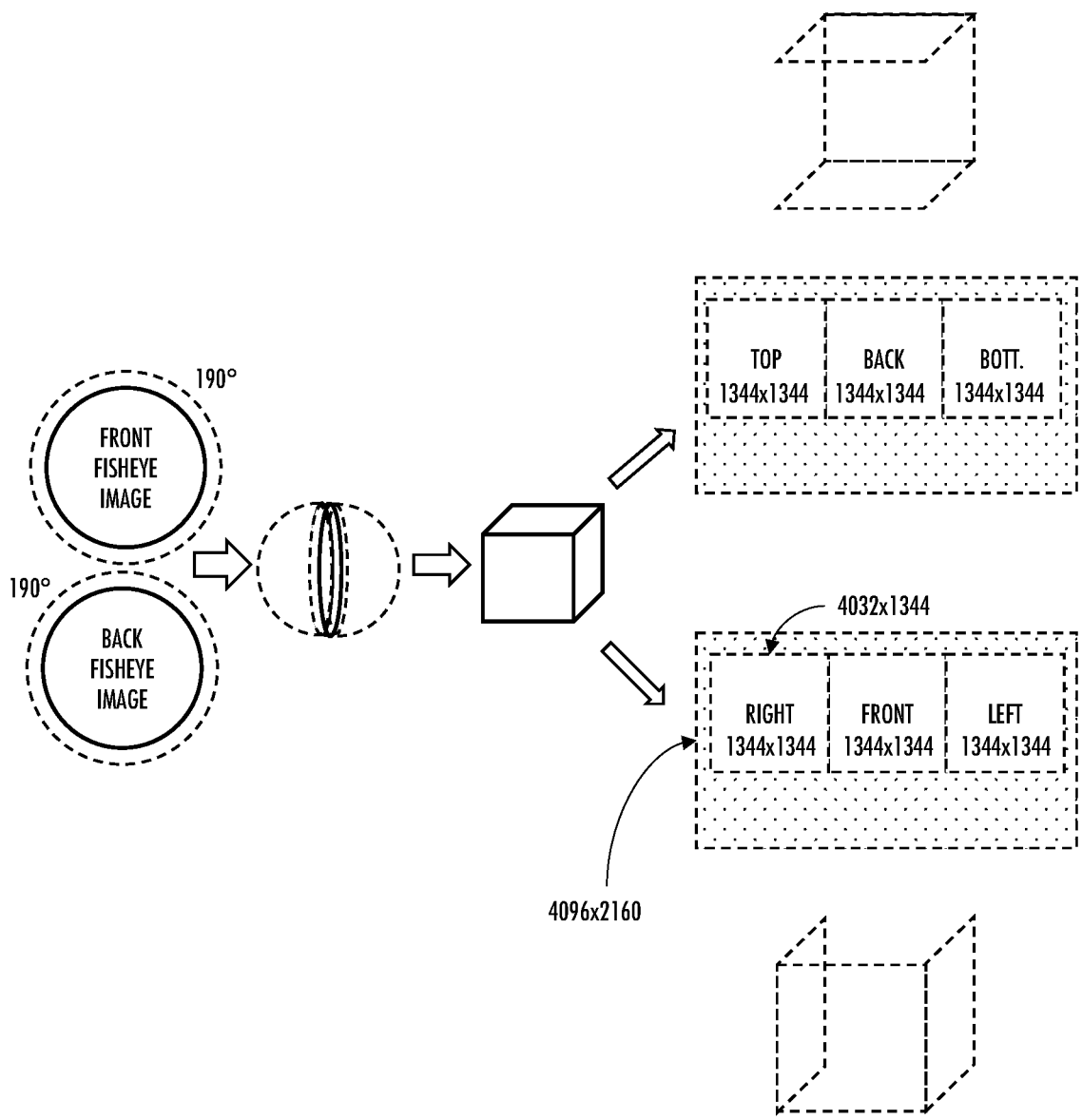

Referring now to FIG. 2C, the aforementioned system of FIGS. 2A-2B may be used to transfer an image with a non-traditional aspect ratio. Specifically, in one such implementation, an EAC format image data can be split into two 4032×1344 segments (smaller than a 4096×2160 container). More directly, as is shown in FIGS. 2A-2B, the two 4032×1344 segments can be handled with two commodity encoder/decoder chains operating in parallel. As a result, a 360° panorama having resolution 4032×2688 can be processed using conventional Level 5.1 HEVC hardware. Commodity codecs are very inexpensive, and parallelization in this manner is more cost efficient than a single codec chain that is capable of handling the entire image.

As a brief aside, the largest segments for codec manufacturers are based on "traditional" computer monitor and/or television display aspect ratios. As a result, existing codec manufacturers assume a particular use case for digital images; "non-traditional" use cases (such as 360° panoramas) do not drive codec manufacture. In other words, 360° panorama A/V formats are not natively supported by the Level 5.1 HEVC codec (which, as stated earlier, only supports resolution formats up to 4096×2160p). Even though a Level 6 HEVC codec can support much larger video formats (up to 8196×4320), the Level 6 HEVC codec is still optimized for traditional aspect ratios. More directly, non-traditional aspect ratios are underserved in the existing marketplace; the difference in pricing (and commercial deployment) between Level 5.1 and Level 6 HEVC codecs is substantial.

As used herein, the terms "non-traditional" and "non-traditional content" refers to content (e.g., still images, video content, stereoscopic, and/or panoramic versions of the foregoing) that does not fully utilize the transmission bandwidth of a codec when encoded/decoded and displayed at the same rate, due to its aspect ratio. For example, the illustrated commodity smartphone device codecs are typically limited to 4K image resolution (approximately 4096 pixels×2160 pixels) at sixty (60) frames per second. However, 360° panoramic imaging content has a different aspect ratio; thus, 360° panoramic imaging content must be e.g., scaled down, or transmitted at a lower rate.

As used herein, the term "commodity" refers to a good, service, etc. that is fungible (interchangeable) with other goods/services of the same market segment. Commodity goods and services compete based on price, rather than brand recognition, functionality, power consumption, performance, or other differentiable features. In other words, commodity codecs provide a stable ratio of price to e.g., performance, power consumption, etc. As but one illustrative example, the market segment for Level 5.1 HEVC codecs has matured such that any Level 5.1 HEVC codec may be substituted for another without substantial impact on a manufacturer's bill-of-material (BOM) pricing because the price per performance ($pixel^2/sec$) does not substantially vary. In contrast, the market for Level 6.0 HEVC codecs is not yet mature; thus, Level 6.0 HEVC codecs are markedly more expensive in terms of price per performance compared to Level 5.1 HEVC codecs. In fact, the difference in BOM cost is so high, that two Level 5.1 HEVC commodity codecs are cheaper than a single Level 6.0 HEVC codec.

While the aforementioned solution supports non-traditional content cost effectively within commodity components, parallelization heavily underutilizes the extant capabilities of the aforementioned hardware (e.g., image sensor size, memory sizes, processor bandwidth, processing rates, etc. all far outstrip the demands of the foregoing technique). More directly, improved solutions for maximizing codec bandwidth for video applications are desired.

Maximized Video Bandwidth Operation

Instead of limiting commodity codecs to their advertised aspect ratios, various aspects of the present disclosure treat codecs as processing resources that provide an overall maximum throughput bandwidth. For example, in one exemplary embodiment, a HEVC Level 5.1 that can produce a 4K60 video at traditional aspect ratios can be reconfigured to handle a non-traditional video at a slower frame rate (e.g., 8K24, 7K30). As described in greater detail hereinafter, the techniques described herein enable a wide range of various video size and/or frame rate combinations.

As a brief aside, most commodity codecs can be flexibly programmed for different use scenarios. For example, even though a HEVC Level 5.1 commodity codec can maximally support 4K60, it may also provide support for less rigorous formats (e.g., 3840 pixels×1920 pixels×24 fps). Under these formats, the codec operates below its maximum performance (e.g., either running at a slower clock rate or idling between frames). In other words, a compliant decoder is rated at a certain number of pixels per second; under less demanding scenarios, it throttles back to consume less power. However, instead of allowing the codec to throttle down, various embodiments of the present disclosure configure the codec to continue processing more data (e.g., another video frame or metadata). In this manner, existing commodity codecs can be "tricked" into handling non-traditional aspect ratios by subdividing the non-traditional content into traditional content chunks, that can be handled piecemeal by the codec.

Figure 3:
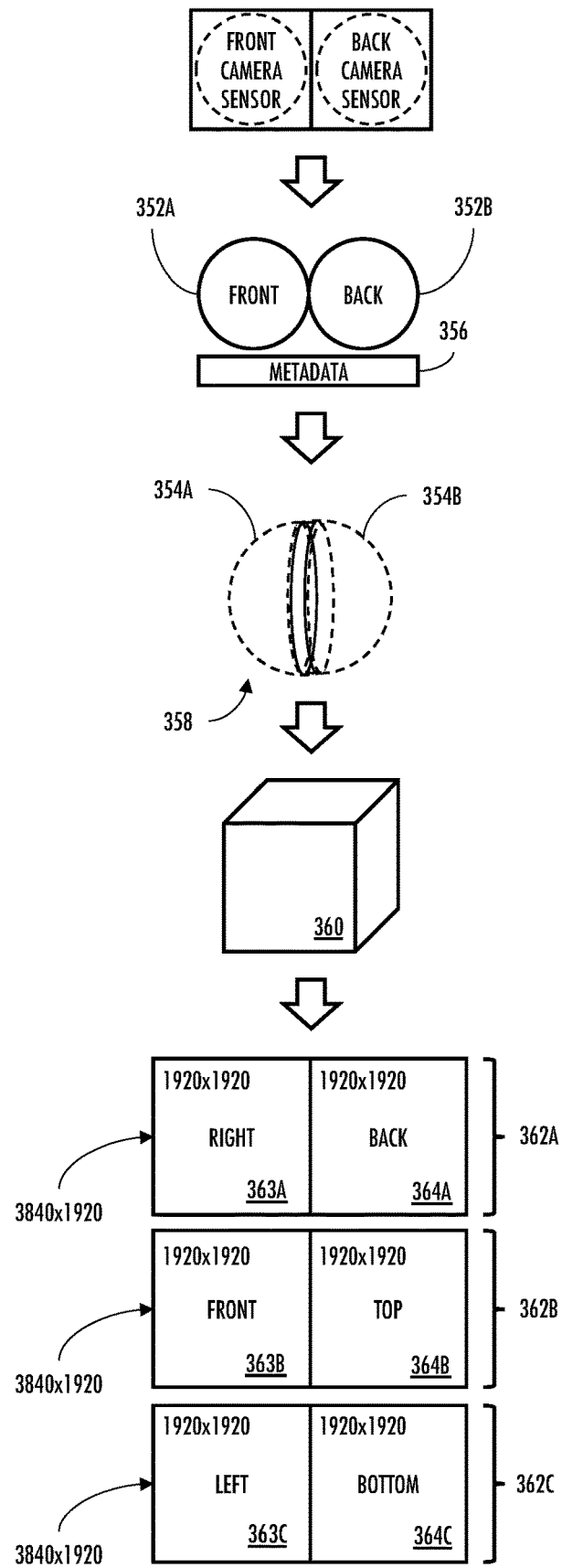
FIG. 3 is a diagram showing an exemplary embodiment of a process for maximizing codec bandwidth, in accordance with the various principles described herein.

FIG. 3 is a diagram showing an exemplary embodiment of a conversion process from fisheye images into an equiangular cubemap (EAC) projection according to the present disclosure. In various embodiments, a fisheye camera or capture device may capture hemispheric image data that corresponds to fisheye images 352A, 352B having a field of view. Each fisheye image 352A, 352B may be taken by a fisheye lens out of a plurality of lenses; for example, an image capturing system may include two fisheye lenses in a Janus-configuration, one facing in a "front" direction and another facing in a "back" direction. In one variant, the fisheye image has a field of view of greater than 180°. The overlapping area can be used to assist in stitching.

The fisheye image data may be stitched "in-camera" into two (2) hemispheres 354A, 354B of a spherical projection 358. Artisans of ordinary skill in the related arts will readily appreciate that stitching in-camera combines image information between the two (2) original images 352A, 352B in order to generate the two (2) hemispheres 354A, 354B of a spherical projection 358; this process may result in some information loss. As a result, in some variants, the stitching information 356 may additionally be retained for subsequent editing (e.g., re-stitching at higher quality, etc.). Stitching techniques commonly entail e.g., combining multiple images to ideally produce an imperceptible (or minimally perceptible) transition between the two (2) hemispheres 354A, 354B of the spherical projection 358. Image stitching techniques commonly include e.g., edge detection, motion detection, parallax correction, perspective warping, blending, lighting adjustment, and/or any number of other image modifications commonly used in the related arts.

Referring back to FIG. 3, the spherical projection 358 is converted into an EAC projection 360. The EAC projection may entail warping the fisheye data according to the ideal mathematical relationship between the spherical projection and the EAC projection. Practically speaking, a fisheye-to-EAC conversion (and vice versa) may involve some degree of information loss, as the repartition of the pixels over the sphere cannot always be precisely controlled (to maintain the number of pixels). However, such information loss can be minimized by, e.g., unbalancing the EAC to make it a UAC, or minimization of the number of projected pixels necessary to have a lossless projection. As such, some embodiments of the present disclosure may additionally remove image information so as to e.g., fit within various codec parameters, or meet other criteria. For instance, in some cases, information loss may be preferred to enable a fit within certain encoding/decoding limitations of a hardware or software codec.

As previously noted, the spherical projection may in one approach be divided into front, back, left, right, top, and bottom portions, wherein each portion represents image data from corresponding fields of view from the two fisheye cameras. For example, the front portion of the spherical projection corresponds to image data from the center of the front fisheye image 352A. The back portion of the spherical projection corresponds to image data from the center of the back fisheye image 352B. The top portion of the spherical projection corresponds to image data stitched together from the top parts of the front and back fisheye images 352A/352B. The left, right, and bottom portions of the spherical projection are similarly collected from their corresponding images.

The front, back, left, right, top, and bottom portions of the fisheye image data are mapped onto corresponding front 363B, back 364A, left 363C, right 363A, top 364B, and bottom 364C facets of the EAC projection 360. Although the different facets may be labeled as shown in FIG. 3, the labeling is wholly arbitrary and denoted for ease of identifying relative directions, including with respect to any other EAC image. In one exemplary embodiment, the converted EAC image 360 can be optionally split into a first image segment 362A corresponding to the right and back facets, a second image segment 362B corresponding to the front and top facets, and a third image segment 362C corresponding to the left and bottom facets. Notably, the exemplary partitioning ensures that each facet represents a continuous image (e.g., right and back facets share an edge), which may improve compression and/or reduce compression artifacts caused by image discontinuities.

Figure 4:
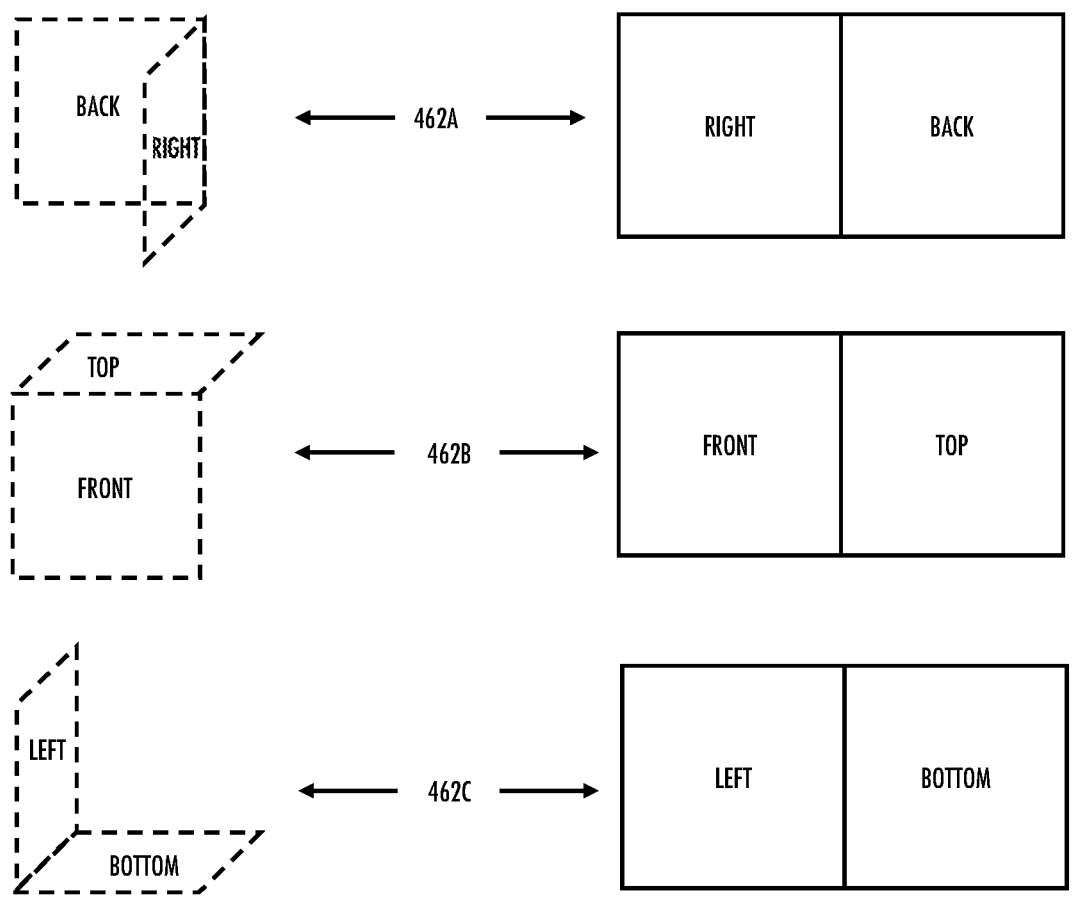
FIGS. 4-5 illustrate exemplary embodiments of equi-angular cubemap (EAC) projection generated using methods and configurations described herein.
Figure 5:
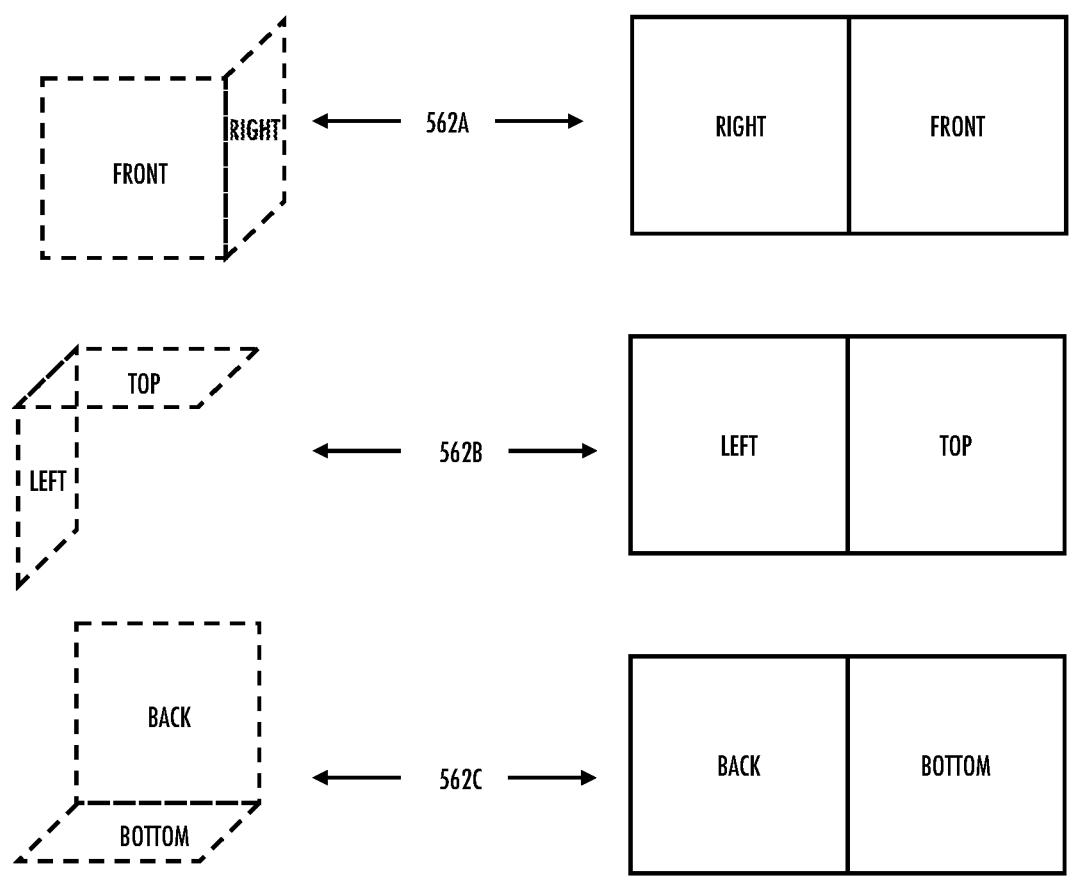

FIGS. 4-5 illustrate exemplary embodiments of EAC projections generated using methods and configurations described herein. The EAC projection is conceptually broken up into first, second, and third image segments or chunks. The image segments are made up of EAC facets. There are multiple possible schemes for dividing up an EAC projection into segments. However, it should be noted that, to prevent image discontinuities, facets making up each image segments should share an edge (i.e., be continuous with each other). In other words, if discontinuities are unacceptable, an image segment should not be made up of, for example, top and bottom facets of an EAC projection, since the top and bottom facets do not share an edge.

Alternative configurations may prefer an image discontinuity in one facet to improve the quality of other facets. For example, in one such implementation, the EAC projection may be split into a front and right facet, a back and left facet, and a top and bottom facet. Such a configuration may provide a better horizontal 360° panorama, however the top and bottom facets may experience some visual artifacts and/or increase compression complexity. Notably however, most top and bottom facets usually are pointed skyward and downward (which may be uninteresting to a viewer).

Referring back to FIG. 4, the first image segment 462A corresponds to the right and back facets of the EAC projection, the second image segment 462B corresponds to the front and top facets of the EAC projection, and the third image segment 462C corresponds to the left and bottom facets of the EAC projection. The front and back facets are generated using image data from central portions of front and back fisheye images, and the left, right, top, and bottom facets are generated using image data from peripheral portions of the front and back fisheye images.

FIG. 5 illustrates an alternative method of conceptually dividing the EAC projection into three image segments. The first image segment 562A corresponds to the right and front facets of the EAC projection, the second image segment 562B corresponds to the left and top facets of the EAC projection, and the third image segment 562C corresponds to the back and bottom facets of the EAC projection.

More generally, various embodiments of the present disclosure can transfer non-traditional content (e.g., EAC projections) by partitioning the content into traditionally-sized chunks supported by the HEVC Level 5.1 codec. Notably, the codec's internal hardware acceleration puts a hard limit on chunk sizes. For example, the hardware limitations of a codec can be inferred from its maximum supported image size; for example, the HEVC Level 5.1 codec can support images up to 4096 pixel columns and/or 2160 pixel rows. An image that is larger than the maximum row and/or column size would typically overrun the hardware memory components; thus, the codec automatically switches software emulated operation (which is much slower than hardware accelerated operation).

In one exemplary "8K24" implementation, each facet may have a resolution of 1920×1920, and thus each EAC image segment (having two facets) may have a total resolution of 3840×1920. The exemplary HEVC Level 5.1 codec provides a maximum throughput bandwidth of $5.308 \times 10^8$ pixels$^2$/sec (i.e., 4096 pixels×2160 pixels×60 fps). By splitting an EAC formatted 360° panorama (5760 pixels×3840 pixels) ("8K" pixels in 360°) into three facets (e.g., 3840 pixels×1920 pixels) and preventing the codec from sub-maximal performance, the exemplary HEVC Level 5.1 codec's maximum throughput bandwidth is sufficient to transfer video at 24 fps (i.e., 3×3840 pixels×1920 pixels×24 fps=$5.308 \times 10^8$ pixels$^2$/sec). In other words, the exemplary spherical video format synergistically fits within existing hardware limitations (row/column limits of the codec hardware and maximum throughput bandwidth limitations). Notably, as used herein, the term "8K24" refers to a projection having an 8K pixel width (7680 pixels) over the horizon. 8K ERP is 7680×3840, the same 360° image in EAC may be encoded as 5760×3840 with no practical information loss.

In another exemplary "7K30" implementation, each facet may have a resolution of 1712×1712, and thus each EAC image segment (having two facets) may have a total resolution of 3424×1712. By splitting an EAC formatted 360° panorama (6848 pixels×3424 pixels) ("7K") into three facets (e.g., 3424 pixels×1712 pixels) and preventing the codec from idling, the exemplary HEVC Level 5.1 codec's maximum throughput bandwidth is sufficient to transfer video at 30 fps (i.e., 3×3424 pixels×1712 pixels×30 fps=5.276×10$^8$ pixels$^2$/sec; which is less than the maximum throughput bandwidth of 5.308×10$^8$ pixels$^2$/sec).

Moreover, while the present disclosure is presented in the context of current commodity codec technologies, artisans of ordinary skill in the related arts will readily appreciate that cutting-edge codecs today (e.g., HEVC Level 5.2, HEVC Level 6.0, etc.) will eventually be commodity codecs. Since non-traditional use cases (e.g., 360° panorama) will likely remain underserved by codec manufacturers, the techniques described herein will remain relevant in the future. For example, the exemplary approach could make use of potential 4K120 hardware (HEVC 5.2) to deliver video having 8K48 video or 7K60 video. In another variant, the approach of the present disclosure could make use of 8K60 supported hardware (HEVC 6.1) to deliver 360° panoramic video having resolution 16K24 or 14K30. In yet another variant, the present disclosure could use 4K240 hardware (also supported by HEVC 6.1) to deliver 7K120 video or 8K96 video (or 8K60 video with ease, with lower overhead than using native 8K60 mode).

Other solutions having resolutions and frame rates consistent with the present disclosure will be recognized by those of ordinary skill when given the present disclosure, the foregoing being merely exemplary.

Parallelization and Power Reduction Variants

In the foregoing discussions, the non-traditional content (an EAC cube) was split into three (3) distinct chunks, where each chunk represents a pair of EAC facets. The resulting chunks were transferred in piecemeal fashion. While the foregoing solution maximizes video bandwidth through the codec chain, not all use cases demand maximum performance. Consequently, the various techniques described herein may be adapted for a variety of other use cases and applications. For example, other variants may e.g., immediately improve the performance of deployed devices, reduce compression artifacts, improve stitching quality, etc.

Figure 6:
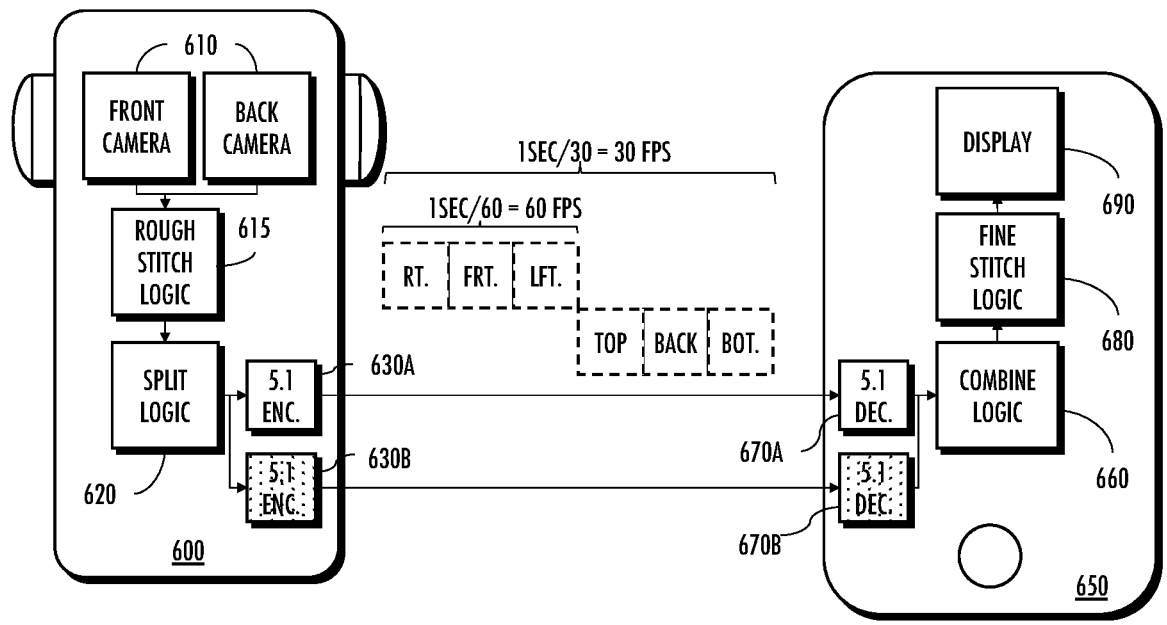
FIG. 6 is a logical block diagram of exemplary parallelized devices that can benefit from reduced power consumption, in accordance with the various principles described herein.

Referring now to FIG. 6, parallelized devices which have already been deployed can immediately benefit from reduced power consumption. As shown therein, a capture device 600 and display device 650 use a parallelized set of codec chains to provide EAC content. The exemplary capture device 600 includes a front and back camera 610, rough stitch logic 615, split logic 620, and a pair of HEVC Level 5.1 encoders 630A/630B. Similarly, the exemplary display device 650 includes a pair of HEVC Level 5.1 decoders 670A/670B, combine logic 660, fine stitch logic 680, and a display 690. As previously alluded to, the system of FIG. 6 may be used to transfer two 4032×1344 segments with two commodity encoder/decoder chains operating in parallel (see also discussion of FIGS. 2A-2C, supra).

In one exemplary embodiment, the system of FIG. 6 can greatly reduce its power consumption by powering down one codec chain and time multiplexing non-traditional content delivery. Specifically, the second codec chain (encoder 630B and decoder 670B) can be powered down. During a first interval (1/60s), the first codec chain transacts a first 4032×1344 segment (right, front, left) and stores the segment; during a second interval, the first codec chain transacts a second 4032×1344 segment (top, back, bottom). The display device 650 can combine the two segments to generate an EAC projection at half of 60 fps. More directly, the resulting bandwidth corresponds to a 4032×2688 resolution EAC projection at 30 fps. This corresponds to a 5.6K30 video content (e.g., front, right, back, and left facets are each 1344×1344; for a total horizontal pixel width of 5376 pixels or "5.6K"). Notably, 5.6K is virtually indistinguishable from 360° panoramas with a 5760 pixel width horizon; a 5760 pixel horizon enables 120° panoramas in any direction at a resolution of 1920×1080 (1080p, also commonly referred to as High Definition (HD)). Thus, even though "5.6K@30" is not recognized by the consuming public, it is nonetheless commercially significant. In other words, one embodiment of the present disclosure enables 5.6K30 video on existing devices, even with one codec chain powered down.

Still other variants of the foregoing techniques may be substituted with equal success by artisans of ordinary skill. More directly, any device having multiple codecs operating in parallel may greatly reduce power by offering reduced rate operation in a time multiplexed manner. For example, a device with three (3) codecs can time multiplex its processing load (e.g., providing ⅓ rate function at ⅓ power, or ⅔ rate performance at ⅔ power, etc.)

Notably, in the foregoing example of FIG. 6, the output video stream only runs at half the rate of the encoding clock. In other words, the codec generates video at 60 fps, but the resulting EAC video is 30 fps. For certain implementations, operating a single codec at speeds higher than the display rate (e.g., 60 fps) may be preferred over running multiple codecs at exactly the display rate (e.g., 30 fps). Specifically, time multiplexing the codec (such that the codec maintains maximal throughput) may be more efficient than running parallel codecs at less than their maximum speed. Conceptually, a codec's overall power consumption includes both variable portions (power that scales relative to the processing load) and fixed portions (power that is consumed regardless of processing load). Time multiplexing codec operation increases the variable power consumption of the codec; however this may be preferable to paying the fixed power consumption for multiple codecs.

Commodity Codec Assumptions and Corrective Variants

As previously noted, codecs are commonly used in a variety of ecosystems. Different use cases often drive codec design (as was previously discussed with regard to traditional aspect ratios, supra). For example, the foregoing discussions have been presented in the context of a capture device (such as the aforementioned HERO and Fusion family of products manufactured by GoPro, Inc.) that encodes non-traditional 360° panoramic video. Capture devices are limited function embedded devices (e.g., action cameras) where the primary design constraints are focused on limited processing, memory, and/or power resources.

A large market segment for codec manufacturers is content delivery businesses. In content delivery networks, video is often encoded once and decoded many times by e.g., a variety of users and/or subscribers. As a practical matter, content delivery services are focused on decoder complexity because many of their users may have limited capability devices (e.g., smart phones) whereas the content delivery network itself may have ample access to encoding resources. In particular, the software encoding inefficiency is only paid once, and the ability to flexibly service many different devices often heavily favors software codecs e.g., for content delivery services.

Figure 7:
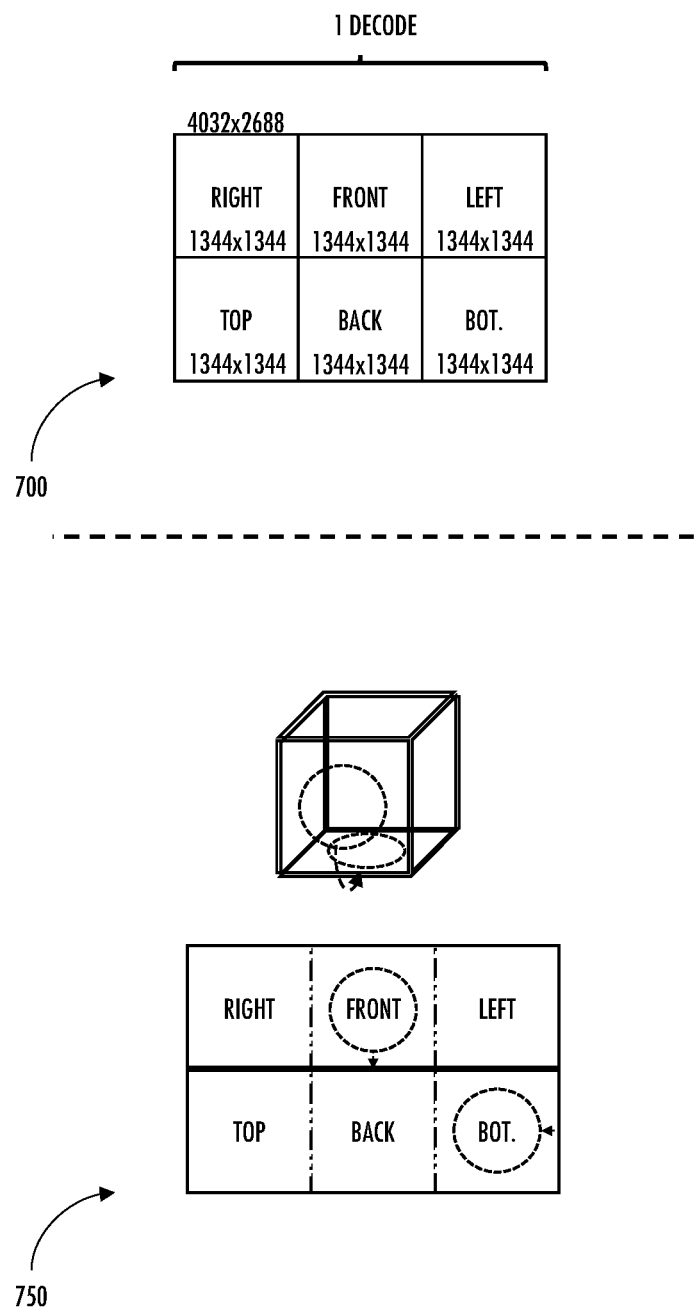
FIG. 7 is a graphical representation of encoding an equi-angular cubemap (EAC) projection, useful to illustrate various principles described herein.

Consider the image of FIG. 7, as shown therein a single EAC format image 700 is shown composed of six (6) 1344×1344 facets. Notably, the non-traditional aspect ratio likely cannot be handled in hardware by commodity HEVC Level 5.1 codecs since it exceeds at least one dimension of the traditional aspect ratio (4096×2160). Regardless, the total number of pixels also exceeds the theoretical maximum number of pixels per frame that a commodity codec should handle (e.g., the 8,912,896 pixels/sec results in a theoretical maximum of dimensions 4096×2176.) In this example, the EAC format image is encoded with a software encoder in a single encode. In other words, the entire EAC image is treated as a single A/V container.

FIG. 7 also includes a graphical representation 750 of object motion, where the object passes from the front facet to the bottom facet. As illustrated therein, there is a discontinuity in the middle of the EAC image. In other words, as the object vertically leaves the front facet, it enters the bottom facet horizontally. The image discontinuity is an unshared edge in the middle of the image content. In other words, the codec treats the entire image as a contiguous rectangle, even though the image has two disparate sections.

Motion prediction across different video frames is based on assumptions about a traditional aspect ratio. While there are sophisticated "slice-aware" codecs, these codecs are proprietary and charge much higher royalties or may be subject to undesirable licensing conditions. Commodity codec technologies rely on well-understood motion prediction techniques that leverage consistent velocity (speed and direction) between video frames for an ERP (equi-rectangular projection). As a result, commodity codecs are not optimized for non-traditional projections (such as EAC). For example, objects moving through the discontinuity disappear from one area of the image and appear in other areas. As a result, non-traditional image formats create high frequency compression artifacts and/or undesirable motion artifacts even when encoded/decoded by software codecs.

Other video manipulation operations may also experience undesirable visual effects. For example, most commodity codecs use a simple transcoding algorithm that is based on pixel value averaging. Since, the commodity codec assumes that the image is a single ERP (equi-rectangular projection) image, it incorrectly handles EAC content. At the discontinuity, pixels from the top slice (right, front, left) are averaged with the bottom slice (top, back, bottom) in other words, the discontinuity blurs a first image with edge data of an unconnected second image (and vice versa). This results in very noticeable visual artifacts in the subsequently stitched EAC projection.

More generally, artisans of ordinary skill in the related arts will readily appreciate that commodity codecs (whether implemented in hardware or software) are based on assumptions that are specific to traditional use cases. Even where a commodity codec is capable of physically handling non-traditional content, shoehorning non-traditional content into commodity codecs can result in loss of quality, inefficient compression, and/or perceptible visual artifacts.

Figure 8:
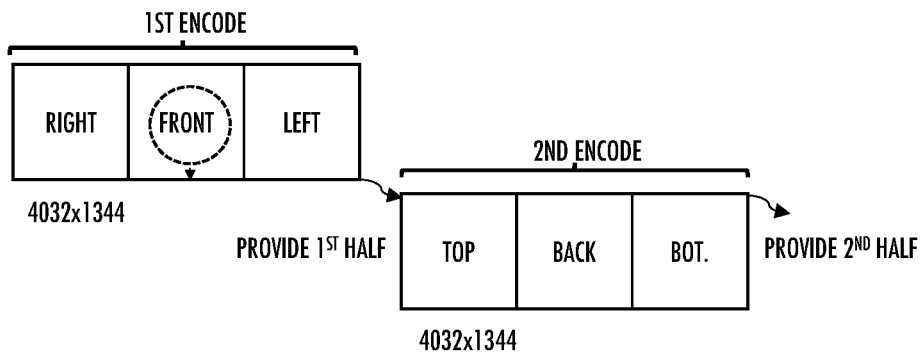
FIG. 8 is a graphical representation of staged encoding of an equi-angular cubemap (EAC) projection, in accordance with the various principles described herein.
Figure 8:
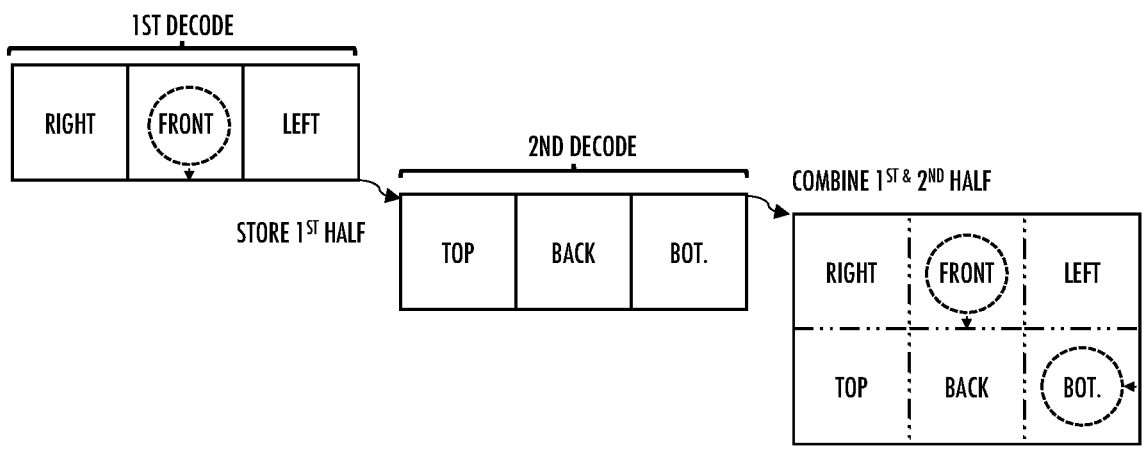

Referring now to FIG. 8, various embodiments of the present disclosure benefit from multiplexed encoding and decoding of different segments. As shown in FIG. 8, during the encoding process 800 a first segment of the EAC content (right, front, left) is encoded during a first stage. Just like the first stage, a second segment (top, back, bottom) is encoded during a second stage of the encoding process 800.

In the illustrated embodiment, the segments are 4032×1344 which fit within the HEVC Level 5.1 encoder's hardware limitations; other embodiments may use image sizes that require software-based encoding. Notably however, the segments (each encoded in isolation) are contiguous; the A/V container is a contiguous image that matches the assumptions used for commodity codecs. As a result, the staged encoding process does not suffer from high frequency compression artifacts and/or undesirable motion artifacts when compared to a single stage encode. Similarly, any image manipulations (e.g., transcoding, scaling, etc.) can be performed using the baseline commodity codec assumptions because each segment is isolated from the other.

Referring back to FIG. 8, during the decoding process 850 a first segment of the EAC content (right, front, left) is decoded during a first stage and stored into processor memory (as opposed to the codec's memory). Subsequently thereafter, a second segment (top, back, bottom) is decoded during a second stage of the decoding process 850. The resulting first and second segments can be combined thereafter. In mobile (embedded) devices the CPU and GPU memory share the same memory (unlike desktop computers which may use a split memory architecture.) Each half frame is rendered into a memory buffer and then assembled. In some variants, it may also be possible to store the top half of the decode into a predefined memory buffer, then decode the second half into the lower half of the same pre-allocated buffer. In other words, the decoder's output may be written piecemeal into the image buffer, but retrieved in its entirety.

While the illustrated embodiment is shown in a time multiplexed manner, the benefits described herein apply equally to any multiplexing scheme. More directly, the various techniques described herein provide image segments (of a larger image of a video stream) to a commodity codec. Conceptually, the techniques described supra configure commodity codecs to handle slices of a projection and offload the resulting slices to external memory. In other words, various embodiments of the present disclosure advantageously do not require slices. Even though slice-aware alternatives may provide more efficiency than a split compression, slice-aware codecs are not commodity components. As a practical matter, the aforementioned solution provides acceptable compression, reduces (or eliminates) visual artifacts, and significantly reduces BOM cost.

Image Processing Limitations and Corrective Variants

As a brief aside, most image and video data structures (e.g., JPG, MP4, etc.) store image data as e.g., pixel values. However, capture devices actually capture data in RAW format. The RAW capture format contains the image sensor's native data format. Many times, the image sensors are e.g., not laid out in a rectangular grid, require demosaicing, lens correction, shutter speed, exposure, white balance, etc. The RAW data format cannot be directly viewed and must be interpreted (or developed) into the image/video data structures.

Action cameras and other 360° applications have unique use considerations that are different than e.g., traditional ERP (equi-rectangular projection) photography. Consider the 360° panoramic use case 900 depicted in FIG. 9; as shown therein, a 360° panorama is captured by an action camera 902. The action camera 902 roughly stitches together a spherical projection 904. The spherical projection 904 may be an EAC projection 906 for delivery via commodity codecs. However, as shown therein, the action camera 902 has two (2) different lighting conditions: the front camera is well lit, whereas the back camera is poorly lit.

Figure 9:
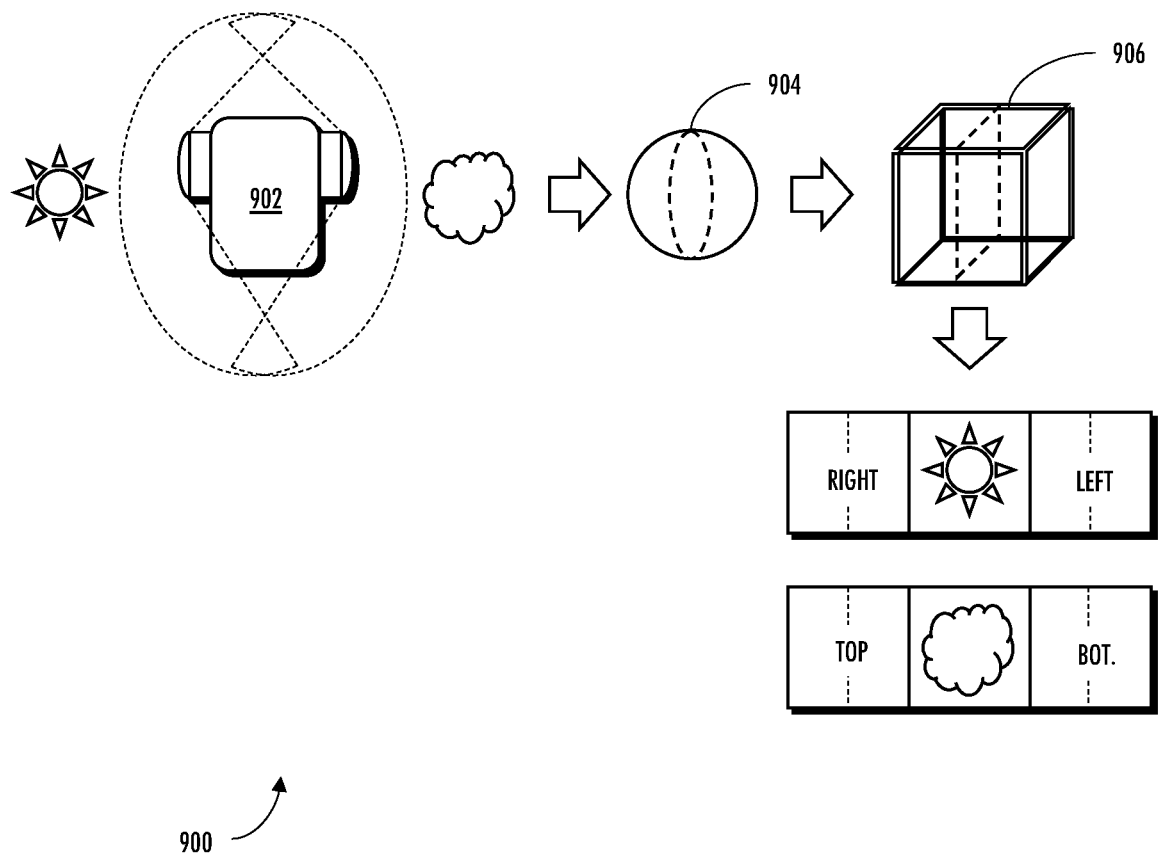
FIG. 9 is a graphical representation of a panoramic use case, useful to illustrate various principles described herein.

The differences in exposure between the front and back camera of FIG. 9 result in unique image processing complications. Specifically, the different lighting conditions for each camera sensor result in different exposure times and shutter speeds which affect color, white balance, and contrast in unpredictable ways. Unfortunately, these differences in shooting conditions can create a visible "exposure transition" in the resulting images. Empirically, the exposure transition is difficult (if not impossible) to blend from post-stitched images (non-RAW image formats do not include enough information to infer e.g., exposure, shutter speed, etc.). In some limited cases, the exposure transition artifact can be reduced with metadata (such as the stitching metadata described supra in FIG. 3); however, metadata often does not provide enough information to correctly adjust for very large differences (e.g., where there is a substantial difference in exposure and shutter speeds between the cameras).

Figure 10:
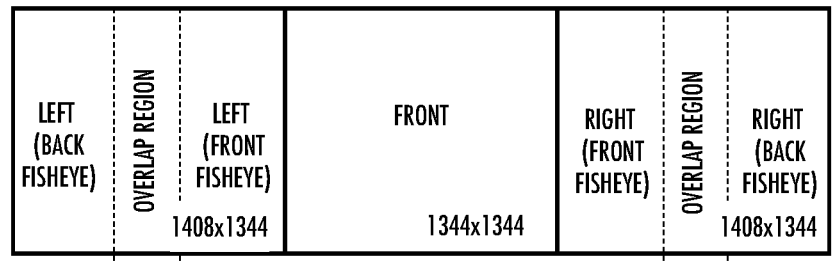
FIG. 10 is a graphical representation of a modified EAC segment to include redundant image data, in accordance with the various principles described herein.
Figure 10:
Figure 10:
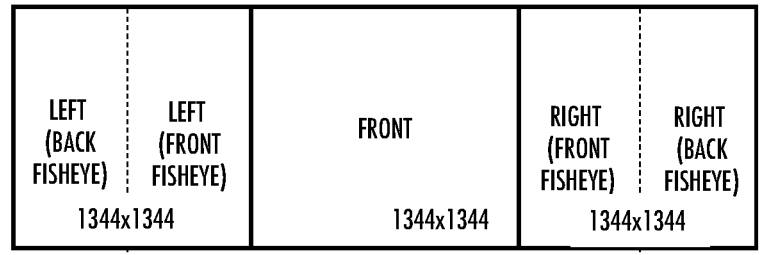
Figure 10:

Referring now to FIG. 10, one exemplary embodiment of the present disclosure uses a modified EAC segment to include redundant image data. As shown in FIG. 10, one exemplary first segment 1000 includes a front facet of 1344×1344 and right and left facets of size 1408×1344. The extra pixel columns in the right and left facets correspond to overlapping image data; in other words, each 32 pixel band contains 16 pixel columns of the post-stitched front fisheye that are correspond to 16 pixel columns of the post-stitched back fisheye. In sum, the size of modified EAC segment is 4096×1344, which fits within the HEVC 5.1 commodity codec (4096×1344).

Notably, the 64 pixel-width overlap region would only correspond to ~3° of actual view (compared to ~10° (224 pixels) of overlap that is natively captured by the camera). In one exemplary embodiment of the present disclosure, the in-camera stitch intelligently identifies the redundant image information to include.

In one exemplary variant, the redundant image information is intelligently selected based on a "warp track." As a brief aside, the warp track is metadata generated by the in-camera stitch logic; the warp track defines how the stitching logic decided to stretch or shrink each pixel at the stitch line. Notably, the warp track metadata can be very small; e.g., for a 5.6K spherical image, the warp track is only 1 kilobyte (KB). As previously alluded to, the warp track is usually not enough information to blend or stitch images, however it can greatly improve blending and stitching. Conceptually, the warp track can be used to infer the effects of parallax and distance on the front and back cameras. Specifically, the warp track identifies whether the image was warped to favor either the front or back camera; due to the lens geometry, this information can also be used to infer the distance from the camera.

Referring back to FIG. 10, in one exemplary embodiment of the present disclosure, the redundant image data is used for inferring differences in captured images for blending (not for display.) In other words, the redundant image data corresponds to the two versions of the same image pixel: one version captured with the front camera's exposure/shutter speed, etc. and the second version captured with the back camera's exposure/shutter speed, etc. The appropriate blending function between the front camera and back camera can be determined by comparing and contrasting the two versions of the same image pixel. In this manner, the display device can smooth over differences in e.g., color, white balance, saturation, etc. As previously alluded to, the redundant image data is not for display and need not be e.g., complete or even contiguous. For example, at small distances the overlap region may include redundant image captures of a contiguous 64 pixel-width band (without decimation); but at large focal distances, the overlap region may include redundant image captures of the entire ~10° which is decimated down to 64 pixel-width.

As shown in FIG. 10, the resulting first segment 1000 reconciles capture differences between the front and back fisheye to generate a blended segment 1050. The blended segment 1050 weights e.g., color, white balance, saturation, etc. so as to smooth over large exposure transition artifacts. The blended segment 1050 is 4032×1344 (e.g., the two 64 pixel width bands have been removed and need not be displayed).

While the foregoing discussion is presented in the context of the first segment (right, front, left), the identical process can be performed for the second segment (top, back, bottom). Artisans of ordinary skill will readily appreciate that the disclosed techniques may be used in any situation where there are large differences in image capture which cannot be easily removed with image processing techniques.

More directly, the various techniques described herein provide redundant image data via existing commodity codec chains. The image data itself may have value above and beyond its display value; in particular, the redundant image data may be useful to infer valuable information about the capture conditions, etc. In some cases, this may provide acceptable results when compared to other much more expensive alternatives (e.g., re-processing and stitching RAW image data). Conceptually, the techniques described supra enable a much broader and richer set of image processing techniques then existing metadata techniques and/or post-processing.

Exemplary Capture and Rendering Apparatus—

Figure 11A:
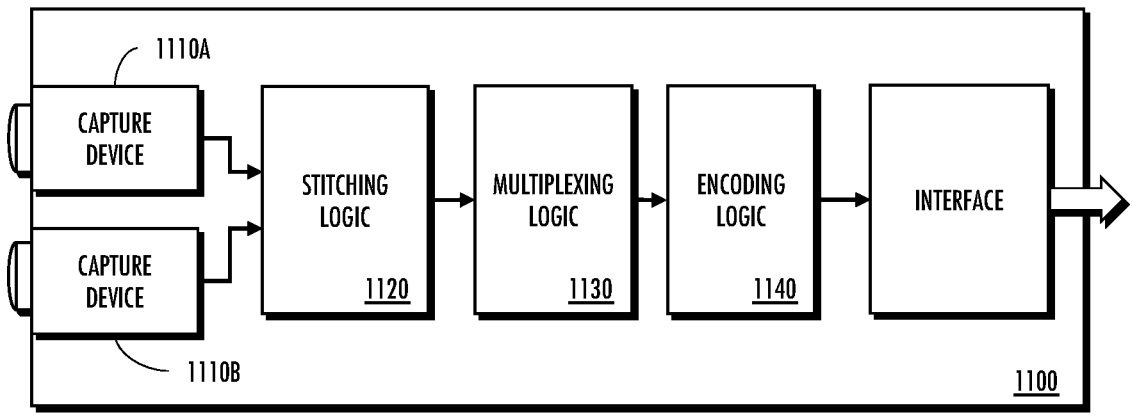
FIGS. 11A-11B are logical block diagrams of exemplary systems, in accordance with the various principles described herein.

Referring now to FIG. 11A, one exemplary system 1100 for the capture and encoding of non-traditional content is shown.

In one embodiment, the system includes one or more camera devices 1110A, 1110B. In one exemplary embodiment, the one or more camera devices are arranged in a Janus-type configuration that includes a front fisheye camera device 1110A and a back fisheye camera device 1110B. The front and back camera devices 1110A, 1110B each capture a greater than 180° fisheye image so as to provide a full 360° panoramic view angle.

Other embodiments may use a greater or fewer number of capture devices (e.g., a 1-camera device, 3-camera device, a 4-camera device, 6 camera device, etc.) For example, a single camera may use a single fisheye lens to capture a 180° field of view which may be segmented into five (5) facets (e.g., a front facet of 1344×1344, and four (4) half facets of 672×1344 for top, bottom, right, left). A four (4) camera setup as a tetrahedron, where each lens captures a ~140° field of view. Similarly, a six (6) camera setup may use a 900 field of view camera for each facet (front, back, top bottom, left, right). Various other configurations may readily be substituted by artisans of ordinary skill in the related arts, given the contents of the present disclosure.

While the foregoing discussion is presented in the context of a symmetric lensing configuration, asymmetric lensing may be substituted with equal success. For example, the front camera may have a field of view of 150°, whereas the back camera may use a field of view of 230° (with an overlap of 20°). In another such example, the first camera may capture 195°, while the second camera capture 225°. In other words, the first and second cameras may capture differing ranges in their respective fields of view. Moreover, while the foregoing examples provide some degree of overlap, other implementations may not overlap (e.g., a 180°/180° configuration) or even underlap (e.g., a 170°/170° configuration); such implementations may be useful where image quality is less important (or not important). For example, security cameras, etc.

The number of pixels in a camera sensor and the FOV are typically "fixed" in a camera system and do not change during use. Generally, the manufacturer will design the camera to suit the intended application(s). For instance, an activity camera that is mobile and rugged will have different capture parameters than a cinema-quality camera designed for e.g., crane mounts or other bulky steadying platforms. Artisans of ordinary skill in the related arts will readily appreciate that the same number of pixels may be used to capture a larger FOV at lower resolution, or a smaller FOV at a higher resolution. For instance, a ten (10) Megapixel (MP) camera sensor that is coupled to a 195° FOV lens provides a higher effective resolution than the same 10 MP camera sensor used for a 245° FOV lens.

In one embodiment, the overlapping regions are fixed and do not change during use. Camera manufacturers may design the camera body with larger or smaller overlap regions; a larger overlap region may be used for better quality image stitching but can result in an overall drop in image resolution as a result of a lower amount of pixels per degree of FOV (i.e., a lower number of pixels per degree of FOV). Conversely, a smaller overlap region may be used for lower quality image stitching but may result in an overall increase in image resolution for the captured image.

In other designs, the overlapping regions may be configurable, due to changes in the camera body and/or lens. Video variants may even be able to dynamically change overlap regions during an ongoing capture. For example, video cameras may have optical lens elements that can physically change (even during ongoing capture) e.g., a zoom body that allows the camera to change the focal length. Similarly, static cameras are commonly designed with modular components that can be changed out; for example, different lens attachments can impart different view angles and/or focal lengths. Some cameras may even be constructed to allow different sensors or may selectively use different sensors with different capture characteristics (e.g., switching between optical and IR sensors, or between higher and lower capture quality sensors).

While the embodiments described herein discuss specific examples, it would be readily apparent to one of ordinary skill that these specific implementations are merely exemplary and that other values of each could be readily substituted with equal success. The following discussion merely being exemplary. Moreover, systems with varying image density profiles may be used consistent with the methods and apparatus of the present disclosure.

In one embodiment, the system 1100 includes stitching logic 1120. In one embodiment, the images are directly stitched by an image signal processor (ISP) into a spherical image. In one exemplary embodiment, stitching "in-camera" is performed on pre-image signal processing (pre-ISP) RAW image data, thus object motion and/or image parallax can be resolved without artifacts introduced by lossy manipulations. In other words, any motion and/or edge discontinuities within the overlapping areas near the stitch can be resolved with the original RAW data (as opposed to compression-based artifacts that may have been added by lossy manipulations).

In other embodiments, stitching may be performed on post-image signal processing (post-ISP) image and/or video data (e.g., TIF, JPEG, MP4, MOV, etc.). Such implementations may be less accurate but may benefit from a broader (and potentially less expensive) spectrum of available stitching software and/or processors. Additionally, such implementations may be performed with general purpose central processor units (CPUs), digital signal processors (DSPs), programmable logic (e.g., FPGAs, etc.) and/or any number of application specific integrated circuits (ASICs), and/or system on a chip (SoC).

In some variants, stitching can require some amount of extrapolation and/or interpolation to cohesively match pixel values from different image sensors. In some cases, the stitching data may be stored as metadata. One such variant may store stitching data as a "warp track" that can be used to infer e.g., distortions in focal length due to parallax.

In some cases, stitched data may be discarded. In other versions, stitched image data may be preserved and transmitted. For example, in one exemplary embodiment, redundant versions of the overlapping stitched areas may be kept. Redundant stitched data may be used to e.g., determine how to blend image data.

Various other embodiments of the present disclosure may additionally perform a variety of other image processing techniques; for example, some variants may scale image resolution up or down, adjust any capture parameters (including adjustments for e.g., exposure, shutter speed, focal distance, white balance, color balance, saturation), blending and/or other image processing techniques.

In one embodiment, the system 1100 includes multiplexing logic 1130 that multiplexes image data based on one or more operational requirements of the encoding and/or decoding logic 1140. Common examples of operational requirements include without limitation: size limits, latency requirements, throughput requirements, processing resources, memory resources, power consumption, and/or any number of other finite resources.

In one embodiment, the multiplexing logic splits non-traditional image data structures into traditional image data structures. In one exemplary embodiment, the multiplexing of traditional data structures is selected to maximize the codec bandwidth. Specifically, the traditional image data structures are selected of a size and transfer rate that optimizes the codec bandwidth, while remaining within codec hardware limitations. In another exemplary embodiment, the multiplexing of traditional data structures is selected to minimize codec power consumption. Specifically, the traditional image data structures are selected of a size and transfer rate that minimizes the total variable and/or fixed power consumption costs of one or more codecs. In still another exemplary embodiment, the multiplexing of traditional data structures is selected to minimize undesirable and/or perceptible artifacts introduced by discontinuities in the image data structure. Specifically, the traditional image data structures are selected of a size to maximize contiguous image data. Still other exemplary embodiments may include redundant image data within traditional data structures so as to assist in downstream post-processing (such as to remove e.g., exposure transitions). Still other multiplexing technologies will be readily appreciated by artisans of ordinary skill in the related arts, the foregoing being purely illustrative.

In one exemplary embodiment, the multiplexing logic may be configured to format the stitched projection into a rectangular format for transfer via commodity codecs. For example, the spherical image may be further re-projected into an equi-angular cubemap (EAC); other rectangular formats may be substituted with equal success. Common examples of other such formats may include without limitation: equi-rectangular projection (ERP), pyramid format, rotated spherical projection (RSP), etc. In some cases, mapping may require stretching and/or shrinking according to ideal geometric and perspective modeling and mathematics. Mapping can be further described within metadata such that it can be later reversed, and the original image data can be recovered, if necessary.

In one exemplary embodiment, the multiplexing logic is configured to split the rectangular format into one or more segments. The segments may be sized so as to fit within hardware constraints. For example, an HEVC encoder or decoder may come with a set of hardware constraints that indicate, inter alia, a maximum picture resolution, maximum frame rate, and maximum bit rate that an encoder or decoder may use. For example, a Level 5.1 HEVC encoder or decoder is limited to 4096×2160 pixels. Hence, the codec could not handle imaging content having a resolution of 5760×3840 (corresponding to a cube having six 1920×1920 pixel sides).

In one such variant, the multiplexing logic is further configured to multiplex the segments so as to remain within the maximum throughput limits of the codec. In the exemplary embodiment, the multiplexing logic schedules one or more segments to be encoded sequentially after another segment has completed (rather than allowing the encoding logic to throttle down). In this manner, the segments may be encoded piecemeal such that so as to fit within the maximum throughput limits of the codec. For example, an HEVC encoder or decoder may multiplex decoding image segments of size 3840×1920 such that three (3) such segments complete every ¹⁄₂₄ sec; e.g., such that the maximum throughput of the codec can sustain an 8K24 (8K Cinema Quality) video stream. More directly, each of the image segments is only 3840×1920 pixels in size, which is well within the capabilities of the HEVC Level 5.1 codec, and the overall throughput stays within the desired encoder logic's maximum limit.

In one exemplary embodiment, the EAC content is partitioned into three (3) image segments, e.g., a first segment having the right/back EAC facets, a second segment having the front/top facets, and a third segment having the left/bottom facets. Artisans of ordinary skill in the related arts will readily appreciate that each of the three image segments represent a contiguous 180° (two (2) facets) subset of the 360° panorama (the 360° panorama having four (4) facets). A horizontal 360° panorama can be reconstructed using four adjacent facets (e.g., left, front, right, back facets) placed in a contiguous fashion.

In one such variant, each image segment groups adjacent facets of a cube map in order to minimize image discontinuity. In other words, the exemplary organization of cube facets minimizes the undesirable effects of edges and motion that span multiple facets, and the partitioning of cube facets ensures that the images can be easily distributed in existing codec ecosystems, including to enable "8K" performance across 360° as previously described. In this manner, the overall codec performance can be improved and the resulting image data is minimally affected by lossy compression. Additionally, the application of the foregoing to the extant codec environment enhances the bandwidth/hardware utilization of the device.

While the illustrated embodiment equally partitions the EAC content into symmetrically sized segments, other configurations may use different partitioning schemes. For example, the captured imaging content may be bisected or divided into imaging portions of either identical or asymmetric size. In some implementations, the captured imaging content may be split up so that a portion of the imaging content is shared between two (or more) of the split up frames.

The multiplexing logic 1130 may be used to sequentially order the image segments and then feed the image segments to an EAC encoder 630 one at a time. The multiplexing logic 1130 may order the three image segments in time/sequence, so that a single encoder may be used for all three segments. Various embodiments of the present disclosure seek to fit the prescribed number of image segments within commodity encoder limitations by also adjusting the frame rate of the video stream. In various embodiments, one EAC encoder can process/generate three (3) separate 3840×1920 images at 24 frames per second. Effectively, this allows the EAC encoder to process a video stream having one full EAC image (made up of three consecutive 3840×1920 image segments) generated at 24 frames per second. More generally however, virtually any combination of image size and/or frame rate may be substituted with equal success, so long as operational parameters are met. In other words, the image size does not exceed hardware limitations and/or the combination of image size and frame rate does not exceed the maximum codec throughput.

In one embodiment, the system 1100 includes an interface to a system 1150 for the rendering of non-traditional imaging content. In one exemplary embodiment, the encoding logic 1140 may generate encoded audio/visual (A/V) data structures that are then provided to the interface. For example, the A/V data structures may include an MP4 container format, and one or more data structures from the encoding logic 1140 may be stored within (e.g., respective) tracks contained within a single MP4 container. In some implementations, the outputs from the EAC encoder may be fed into two or more MP4 container structures (e.g., into single track MP4 containers, into multiple dual track MP4 containers, and/or into multiple multi-track MP4 containers, etc.). These A/V container(s) may then be transmitted and stored into a storage apparatus (e.g., a hard drive or other types of memory) and/or may be transmitted across an interface (such as a network interface over, for example, the Internet).

In one embodiment, the outputted encoded images may be fed into the A/V container separately, i.e., one at a time. One or more of these A/V container(s) may also include respective metadata which may be utilized in order to, inter alia, facilitate rendering or reconstruction of the non-traditional imaging content.

The aforementioned camera devices 1110, stitching logic 1120, multiplexing logic 1130, and/or encoding logic 1140 may be implemented through the use of a computer program containing computer-readable instructions that may be executed by one or more processing units. These computer-readable instructions may be stored in a computer-readable apparatus (e.g., memory). In some implementations, one or more of the aforementioned camera devices 1110, stitching logic 1120, multiplexing logic 1130, and/or encoding logic 1140 may be implemented through dedicated hardware components (e.g., one or more integrated circuits).

Figure 11B:
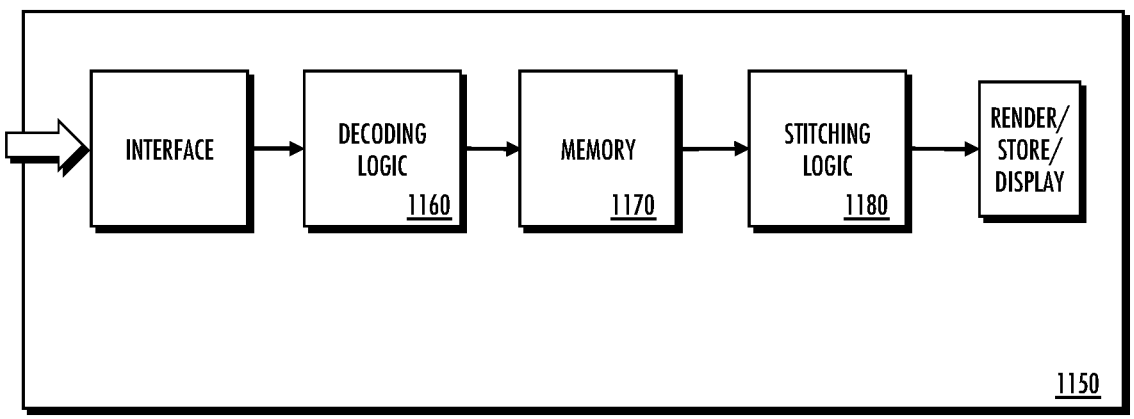

Referring now to FIG. 11B, a system 1150 for the rendering of non-traditional imaging content is shown and described in detail. The A/V container(s), such as the A/V container(s) output from system 1100, may be received or retrieved by system 1150. In some implementations, the system 1150 may read metadata information contained within the A/V container(s) so as to enable the system 1150 to, for example, configure the decoding logic 1160 to properly partition out the imaging portions contained within the A/V container(s) so that these imaging portions may be properly decoded.

In one embodiment, the system 1150 includes decoding logic 1160 configured to decode traditional imaging content segments. In one exemplary embodiment, the decoding logic 1160 is a commodity codec that is subject to one or more operational requirements. In some cases, the decoding logic 1160 is limited by one or more operational requirements specified by encoding logic. In other cases, the decoding logic 1160 is limited by its own operational requirements.

For example, a non-commodity decoder may be bottlenecked by a commodity encoder or vice versa.

As previously noted, the imaging content is received in traditional image data structures but can be de-multiplexed into non-traditional image data structures. In one exemplary embodiment, the de-multiplexing of traditional data structures is selected to maximize the codec bandwidth. In another exemplary embodiment, the de-multiplexing of traditional data structures is selected to minimize codec power consumption. In still another exemplary embodiment, the de-multiplexing of traditional data structures is selected to minimize undesirable and/or perceptible artifacts introduced by discontinuities in the image data structure. Still other exemplary embodiments may de-multiplex redundant image data within traditional data structures so as to reduce e.g., exposure transitions. Still other de-multiplexing technologies will be readily appreciated by artisans of ordinary skill in the related arts, the foregoing being purely illustrative.

In one embodiment, the system 1150 includes memory 1170 configured to store traditional imaging content segments. In some cases, the memory 1170 is a bulk storage memory that is external to decoding logic 1160. In other cases, the memory 1170 may be locally resident (on-die) to the decoding logic 1160.

In one embodiment, the system 1150 includes stitching logic 1180 configured to construct non-traditional imaging content from traditional content segments. In particular, the decoded traditional content segments may be retrieved from memory 1170 and/or directly from the decoder logic 1160 and provided to the stitch logic 1180. In one embodiment, the stitch logic 1180 includes a process of grouping a number of incoming image portions, and then stitching the grouped image portions into one image.

In one exemplary implementation, the stitching algorithm for the stitch logic 1180 may recombine the decoded image portions based on metadata information contained within the A/V container(s). In some cases, as the decoded image portions may be perfectly "cut", no higher level "stitching" is required, rather the decoded image portions may be aligned via pixel alignment in, for example, a graphic processing units' (GPU) fragment shader. In other cases, the decoded image portions may need to be blended and/or re-stitched based on metadata and/or redundant imaging data.

In one embodiment, the system 1150 includes logic configured to render, store, and/or display non-traditional imaging content. Common examples include e.g., display devices such as computer monitors, televisions, mobile phones, VR headsets, and/or any number of other human interface devices.

The aforementioned decoding logic 1160, memory 1170, and/or stitching logic 1180 may be implemented through the use of a computer program containing computer-readable instructions that may be executed by one or more processing units. These computer-readable instructions may be stored in a computer-readable apparatus (e.g., memory). In some implementations, one or more of the aforementioned decoding logic 1160, memory 1170, and/or stitching logic 1180 may be implemented through dedicated hardware components (e.g., one or more integrated circuits).

In some embodiments, the various portions of the systems 1100, 1150 may be located at, and/or various functions performed by, different physical or logical entities. For example, the system 1100 may be located on a single device (e.g., an action camera). The system 1150 may be located on a different device (e.g., mobile user device, storage device, graphics engine, PC, laptop, server, cloud entity, etc.) that is separate from the abovementioned device.

Exemplary Methods—

Figure 12:
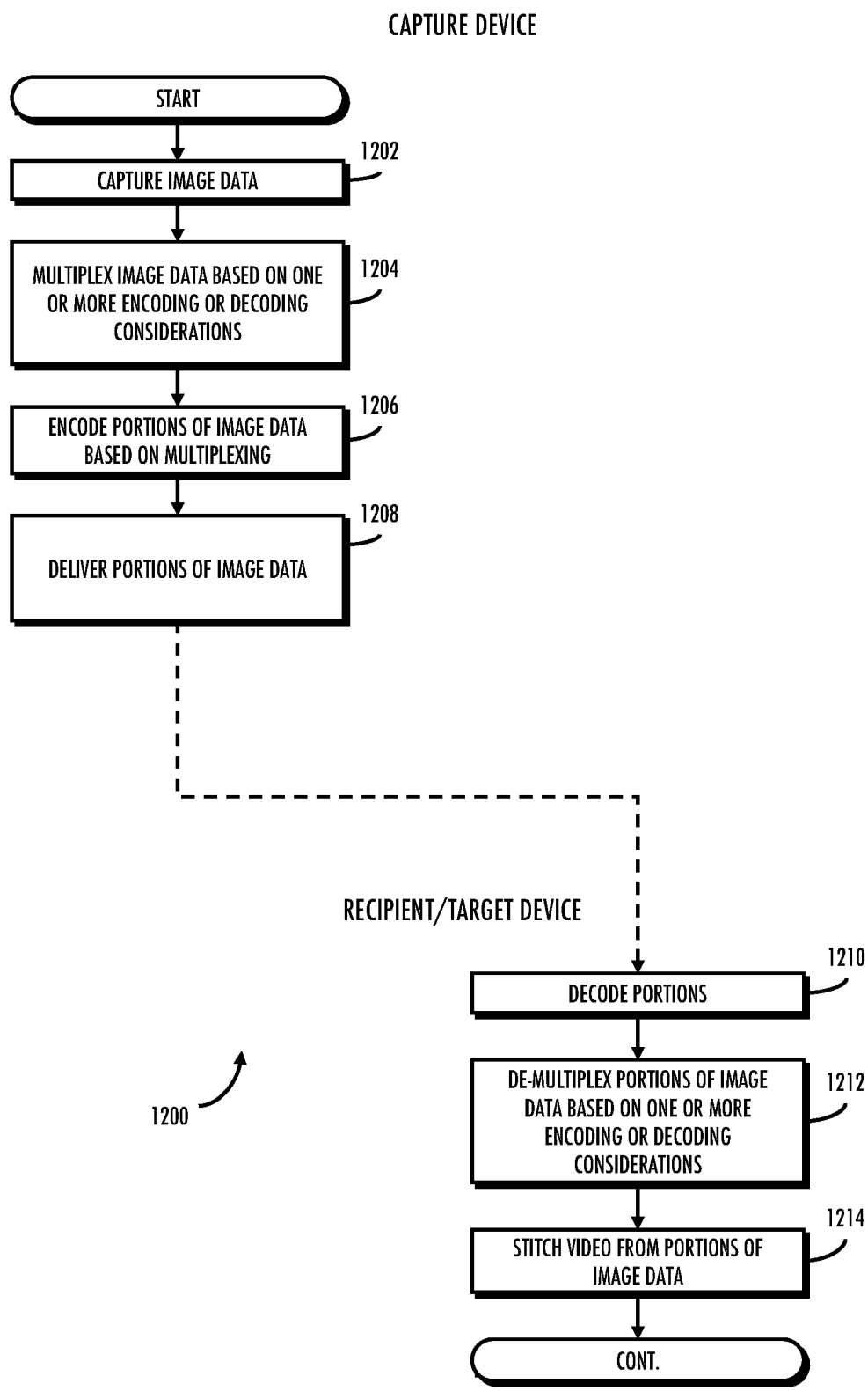
FIG. 12 illustrates logical flow diagrams of exemplary embodiments of methods, in accordance with the various principles described herein.

Referring now to FIG. 12, one exemplary methodology 1200 for the processing of image data is shown and described in detail.

At step 1202 of the method 1200, image data is captured. In one embodiment, the image data is captured via multiple camera sensors. For example, the image data may be captured via a Janus-type camera. In other embodiments, the image data is generated, for example the image data may be generated via computer graphics engines. Still other embodiments may capture image data from a variety of networked camera devices.

While the present disclosure is primarily directed to moving image data (e.g., video), other applications may be substituted with equal success. For example, a very large static image may be sub-divided and transmitted via commodity codecs, given the contents of the present disclosure. In other examples, a very small but high speed video may be sub-divided and transmitted via commodity codecs, given the contents of the present disclosure.

Moreover, while the present disclosure is primarily directed to e.g., human perceptible imaging, the various techniques described herein may be used with equal success in a variety of other imaging scenarios including without limitation e.g., artificial intelligence, machine learning, light field photography, and/or any other imaging data application.

In one exemplary embodiment, the captured image data is characterized by a non-traditional aspect ratio. In some embodiments, the captured image data is wider or taller than a codec can handle within its hardware. In other embodiments, the captured image data may be received faster or slower than the codec hardware can natively handle.

At step 1204 of the method 1200, image data is multiplexed based on one or more encoding or decoding considerations. Specifically, various embodiments of the present disclosure are directed to resolving situations where the captured image data (e.g., video) suffers a bottleneck due to encoding or decoding considerations.

In one exemplary embodiment, the considerations are operational requirements imposed by the hardware. For example, the codec may be limited by one or more operational requirements specified by its own operation. In other cases, the codec may be limited by one or more operational requirements specified by a peer device. For example, a non-commodity decoder may be bottlenecked by a commodity encoder or vice versa. Still other cases may introduce non-image-based bottlenecks: for example, a codec may be bottlenecked by human interaction, network interaction, downstream/upstream processing/memory complexity, or any number of other considerations.

Various embodiments of the present disclosure multiplex the image data into one or more constituent portions so as to overcome encoding or decoding considerations. For example, a codec that has a maximum line size can receive image data in bite-sized chunks that fit within the maximum line size. Similarly, a codec that has a maximum frame rate can receive image data at time intervals that comply with the maximum frame rate. In yet other embodiments, codecs that need to maintain a specific power consumption may be operated in modes that do not exceed the power consumption limit, etc.

Various other embodiments of the present disclosure multiplex the image data into one or more constituent portions so as to correct for encoding or decoding assumptions. For example, a codec that treats motion in a particular way may be fed image data that is segmented consistent with those assumptions.

In one exemplary embodiment, the considerations are image processing limitations imposed by the hardware. For example, camera sensors may be unable to correctly blend images captured under different lighting conditions due to e.g., differences in exposure, shutter speed, etc. Under such implementations, the codec may multiplex additional redundant image data (so as to enable more sophisticated blending techniques).

At step 1206 of the method 1200, portions of image data are encoded based on the multiplexing. In one exemplary embodiment, the image data is encoded at a first dimension that differs from a subsequent dimension of use. For example, the image data may be encoded at 3840×1920, whereas the subsequent display size may be 7680×3840. In some embodiments, the image data may include image data that is redundant that is never displayed. For example, a segment may be encoded to 4096×1344, where only 4032×1344 are to be subsequently displayed.

In one exemplary embodiment, the image data is encoded at a first rate that differs from a subsequent rate of use. For example, the image data may be encoded at 60 fps, whereas the subsequent rate of display may only be 24 fps.

In one exemplary embodiment, the image data is encoded at a first dimension that differs from a subsequent dimension of use. For example, the image data may be encoded at 3840×1920, whereas the subsequent display size may be 7680×3840.

At step 1208 of the method 1200, portions of image data are delivered. In one exemplary embodiment, the portions of image data are transferred piecemeal. In other embodiments, the portions of image data may be delivered together. Still other embodiments may deliver image data based on request, query or other delivery mechanism.

At step 1210 of the method 1200, the portions of image data are decoded. In one exemplary embodiment, the portions of image data are decoded piecemeal and stored into external memory. In other embodiments, the portions of image data may be accumulated and recombined within codec operational memory.

At step 1212 of the method 1200, the portions of image data are de-multiplexed based on one or more encoding or decoding considerations. For example, various embodiments of the present disclosure are directed to resolving situations where the rendered image data (e.g., video) suffers a bottleneck due to encoding or decoding considerations, such as was previously discussed supra. For example, a codec that has a maximum line size can receive image data in bite-sized chunks that fit within the maximum line size, etc.

At step 1214 of the method 1200, video data stitched from the portions of image data. In some cases, stitching may be performed based on metadata, redundant image data, and/or any number of other techniques.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. Byway of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits AND APPARATUS FOR MAXIMIZING CODEC BANDWIDTH IN VIDEO APPLICATIONS (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for piecemeal encoding of a video frame, comprising:
   capturing the video frame at a frame rate;
   splitting the video frame into a plurality of portions, where each portion comprises adjacent facets that share an edge of a cubemap to reduce compression artifacts caused by image discontinuities;
   selecting a number of codecs to power based on a time multiplex ratio of an encoding rate to the frame rate;
   encoding the plurality of portions at the encoding rate to generate a plurality of encoded segments; and
   transmitting the plurality of encoded segments to a display device.

2. The method of claim 1, where capturing the video frame comprises:
   capturing a first image via a first camera and a second image via a second camera; and
   stitching the first image and the second image.

3. The method of claim 2, where stitching the first image and the second image further comprises:
   identifying redundant image data in the first image and the second image; and
   stretching or shrinking pixels of the first image or the second image at a stitch line based on the redundant image data.

4. The method of claim 3, further comprising transmitting a warp track to the display device that describes the pixels of the first image or the second image that were stretched or shrunk.

5. The method of claim 2, where stitching the first image and the second image further comprises projecting the first image and the second image to a cubemap projection comprising a plurality of facets.

6. The method of claim 1, where the plurality of encoded segments are transmitted to the display device at the encoding rate; and
   enabling the display device to display the video frame at the frame rate.

7. A capture apparatus configured to piecemeal encode video frames, comprising:
   a first camera;
   a plurality of codecs;
   a processor; and
   a non-transitory computer readable medium comprising instructions that when executed by the processor, cause the capture apparatus to:
   capture a video frame at a frame rate;
   split the video frame into a plurality of portions;
   select a number of codecs from the plurality of codecs to power based on a time multiplex ratio of an encoding rate to the frame rate;
   encode the plurality of portions at the encoding rate to generate a plurality of encoded segments; and
   transmit the plurality of encoded segments to a display device.

8. The capture apparatus of claim 7, further comprising a second camera;
   where the instructions, when executed by the processor, cause the capture apparatus to:
   capture a first image via the first camera and a second image via the second camera; and
   stitch the first image and the second image to generate the video frame.

9. The capture apparatus of claim 7, where the video frame is a cubemap projection of a plurality of facets and each portion of the plurality of portions comprises at least two adjacent facets of the plurality of facets.

10. The capture apparatus of claim 9, where the instructions, when executed by the processor, cause the capture apparatus to:
    encode a first portion of the plurality of portions at a first time interval; and
    encode a second portion of the plurality of portions at a second time interval after the first time interval.

11. A display apparatus configured to piecemeal decode video frames, comprising:
    a processing system comprising:
    a codec;
    a shared memory buffer;
    a central processing unit coupled to the shared memory buffer;
    a graphic processing unit coupled to the shared memory buffer; and a non-transitory computer readable medium comprising instructions that when executed by the processing system, cause the display apparatus to:
receive a plurality of encoded segments;
decode the plurality of encoded segments at a decoding rate to generate a plurality of portions;
write a first portion of the plurality of portions to a first location of the shared memory buffer and write a second portion of the plurality of portions to a second location of the shared memory buffer;
combine the plurality of portions into a video frame; and
render the plurality of portions into the video frame at a frame rate that is a time multiplex of the decoding rate.

12. The display apparatus of claim 11, where the instructions, when executed by the processor processing system, cause the display apparatus to:
write a third portion of the plurality of portions to a third location of the shared memory buffer.

13. The display apparatus of claim 11, further comprising a display and the instructions, when executed by the processing system, cause the display apparatus to display the video frame.

14. The display apparatus of claim 13, where the video frame comprises a cubemap projection of a plurality of facets and each portion of the plurality of portions comprises at least two adjacent facets of the plurality of facets.

15. The display apparatus of claim 14, where the cubemap projection has a horizontal pixel width of 5376 pixels and the frame rate comprises 30 frames per second.

16. The display apparatus of claim 15, where the cubemap projection can provide 120° panoramas in any direction at a resolution of 1920×1080.

17. The display apparatus of claim 14, where the cubemap projection has a horizontal pixel width of 7680 pixels and the frame rate comprises 24 frames per second.

18. The display apparatus of claim 14, where the cubemap projection has a horizontal pixel width of 6848 pixels and the frame rate comprises 30 frames per second.

* * * * *

UNITED STATES PATENT AND TRADEMARK OFFICE
CERTIFICATE OF CORRECTION

| | | |
|---|---|---|
| PATENT NO. | : 11,800,141 B2 | Page 1 of 1 |
| APPLICATION NO. | : 17/453217 | |
| DATED | : October 24, 2023 | |
| INVENTOR(S) | : David Newman et al. | |

It is certified that error appears in the above-identified patent and that said Letters Patent is hereby corrected as shown below:

In the Specification

Column 8, Line 1, the reference numeral "no" should read --110--.

Column 18, Line 43, the text "900" should read --90°--.

Column 26, Line 48, cancel the text beginning with "AND APPARATUS FOR" and ending "VIDEO APPLICATIONS" in Column 26, Line 50.

Signed and Sealed this
Third Day of September, 2024

*Katherine Kelly Vidal*

Katherine Kelly Vidal
*Director of the United States Patent and Trademark Office*